(12) United States Patent
Allen

(10) Patent No.: US 6,658,625 B1
(45) Date of Patent: Dec. 2, 2003

(54) APPARATUS AND METHOD FOR GENERIC DATA CONVERSION

(75) Inventor: Paul V. Allen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/291,361

(22) Filed: Apr. 14, 1999

(51) Int. Cl.$^7$ ............................................... G06F 17/00
(52) U.S. Cl. ....................... 715/523; 715/516; 341/50; 709/246; 708/204
(58) Field of Search ................................ 707/523, 513, 707/101, 102, 103 Y; 715/516; 341/50, 51; 709/319, 329, 246; 708/204

(56) References Cited

U.S. PATENT DOCUMENTS

| | | | |
|---|---|---|---|
| 5,261,077 A | * 11/1993 | Duval et al. | 710/306 |
| 5,694,580 A | * 12/1997 | Narita et al. | 710/1 |
| 5,793,381 A | * 8/1998 | Edberg et al. | 345/467 |
| 5,831,560 A | * 11/1998 | Gelfenbain | 341/106 |
| 5,898,874 A | * 4/1999 | Gelfenbain | 717/140 |
| 5,961,626 A | * 10/1999 | Harrison et al. | 370/466 |
| 5,970,490 A | * 10/1999 | Morgenstern | 707/10 |
| 5,999,937 A | * 12/1999 | Ellard | 707/101 |
| 6,055,370 A | * 4/2000 | Brown et al. | 717/142 |
| 6,072,481 A | * 6/2000 | Matsushita et al. | 345/700 |
| 6,083,276 A | * 7/2000 | Davidson et al. | 709/200 |
| 6,085,203 A | * 7/2000 | Ahlers et al. | 715/523 |
| 6,094,684 A | * 7/2000 | Pallmann | 709/227 |
| 6,154,747 A | * 11/2000 | Hunt | 707/100 |
| 6,173,288 B1 | * 1/2001 | Diedrich et al. | 707/102 |
| 6,189,045 B1 | * 2/2001 | O'Shea et al. | 709/246 |
| 6,226,675 B1 | * 5/2001 | Meltzer et al. | 709/223 |
| 6,282,576 B1 | * 8/2001 | Lane | 709/246 |
| 6,356,920 B1 | * 3/2002 | Vandersluis | 707/501.1 |
| 6,370,531 B1 | * 4/2002 | Boutcher et al. | 705/54 |
| 6,377,952 B1 | * 4/2002 | Inohara et al. | 707/101 |
| 6,510,468 B1 | * 1/2003 | Hayne | 709/246 |
| 6,601,108 B1 | * 7/2003 | Marmor | 709/246 |
| 2001/0051974 A1 | * 12/2001 | Saad | 709/202 |
| 2003/0033317 A1 | * 2/2003 | Ziglin | 707/102 |

OTHER PUBLICATIONS

Michael Edwards, XML: Data the Way You Want It (Microsoft Corporation: Oct. 31, 1997), downloaded from msdn.Microsoft.com on Dec. 9, 2002.*
Microsoft Corp., XML: A Technical Perspective (Feb. 20, 1998), downloaded from msdn. microsoft.com.*
Microsoft Corp., XML: Enabling Next–Generation Web Applications (Apr. 3, 1998), downloaded from msdn.microsoft.com.*
Charles Heinemann, Internet Explorer 5 and XML (Microsoft Corporation, Nov. 4, 1998) downloaded from msdn. microsoft.com.*

* cited by examiner

Primary Examiner—Joseph H. Feild
Assistant Examiner—Charles Bieneman
(74) Attorney, Agent, or Firm—Schmeiser, Olsen & Watts LLP

(57) ABSTRACT

The preferred embodiments of the present invention provide a method and apparatus for generic data conversion. A generic data convertor interprets a data description that has configurable data definitions that can accommodate changes in the data. The data definitions can allow the data type, character set, location, and length of data elements in the data stream or file to be described and easily modified. The data convertor uses the data description to determine how to convert the data and, if necessary, where data elements are in the data. The data convertor is particularly useful for converting data that is sent to and/or received from a server. The data convertor and data description cooperate to support calling multiple releases of the server using the same data description. In addition, the data convertor may also call the server program with the correct, converted parameters in the correct order. The data convertor usually waits until a requesting application asks for particular data elements in the data before converting the data elements.

51 Claims, 16 Drawing Sheets

```
<struct name="receiver">
  <data name="lengthOfEntry" type="int" length="4" />
  <data name="dispToObjectPathName" type="int" length="4" />
  <data name="lengthOfObjectPathName" type="int" length="4" />
  ....
  <data name="dispToReadWriteHostNames" type="int" length="4" />
  <data name="nbrOfReadWriteHostNames" type="int" length="4" />
  ....
  <data name="pathName" type="char" length="lengthOfObjectPathName"
    offset="dispToObjectPathName" offsetfrom="receiver" -->
  <!-- "R/W Access List" array -->
  <struct name="rwAccessList" offset="dispToReadWriteHostNames"
    offsetfrom="receiver" count="nbrOfReadWriteHostNames">
    <data name="lengthOfHostNameEntry" type="int" length="4" />
    <data name="lengthOfHostName" type="int" length="4" />
    <data name="hostName" type="char" length="20"
      minvrm="v1r1m1" maxvrm="v1r255m255" />
    <data name="hostName" type="char" length="lengthOfHostName"
      minvrm="v2r1m1" maxvrm="v2r255m255" />
    <data type="byte" length="0" offset="lengthOfHostNameEntry" />
    <!--skip any reserved space -->
</struct>
....
```

FIG. 4A-2

```
                                                                        ⎫
                                                                        ⎬ 570
<data type="byte" length="0" offset="lengthOfEntry" />                  
    <!--skip any reserved space-->
</struct>
.....
<!-- Return records feedback information -->                            ⎫
<struct name="returnedRcdsFdbkInfo">                                    ⎪
    <data name="bytesReturned" type="int" length="4" />                 ⎪
    <data name="bytesAvailable" type="int" length="4" />                ⎬ 520
    <data name="nbrOfNFSExportEntries" type="int" length="4" />         ⎪
    <data name="handle" type="int" length="4" />                        ⎪
</struct>                                                               ⎪
<!-- continued on FIG. 5B -->                                           ⎭
```

```
<!-- continued from FIG. 4A -->
<program name="qznfrtve" path="/QSYS.lib/QZNFRTVE.pgm"
    parseorder="returnedRcdsFdbkInfo receiver" >
<data name="receiver" type="struct" struct="receiver" usage="output"
    count="returnedRcdsFdbkInfo.nbrOfNFSExportEntries"
    outputsize="receiverLength" />
<data name="receiverLength" type="int" length="4" usage="input"
    init="16384" />
<data name="returnedRcdsFdbkInfo" type="struct"
    struct="returnedRcdsFdbkInfo" usage="output" />
<data name="formatName" type="char" length="8" usage="input"
    init="EXPE0100" />
<data name="objectPathName" type="char" length="lengthObjPathName"
    usage="input" init="*FIRST" />
.....
<data name="errorCode" type="int" length="4" usage="input" init="0" />
</program>
</pcml>
```

```
import com.ibm.as400.data.ProgramCallDocument;
import com.ibm.as400.data.PcmlException;
import com.ibm.as400.access.*;

// import other classes here public class qznfrtve
{
    public static void main(String[] argv)
    {
        System.setErr(System.out);
        // This program uses the parameters from argv[].  These parameters
        // are checked for the proper number and content and then placed
        // into already reserved Strings for systemName, userName, and
        // userPassword.  These parameters are used to call an AS400
        // object.
```

```
// Create a new AS400 object
AS400 m_system_ = new AS400 ( systemName, userName,
          userPassword );

boolean rc = false;
ProgramCallDocument pcml = null;
String data;
int[] rcd = new int[1];
int[] index = new int[2];
```
⎬ 610

```
// try and create a new PCML object
try
{
    pcml = new ProgramCallDocument ( m_system_,
                "qznfrtve" );
}
catch ( PcmlException e )
{
    // If there's an error, print out the error and end
}
// Continued in FIG. 5B
```
⎬ 620

```
System.out.println("Calling QZNFTVTE...");
// try and call the AS400 program "qznfrtve"
try
{
    rc = pcml.callProgram("qznfrtve");
    // if RC is false, the call to the AS400 program failed
    if (rc == false)
    {
        // use the PCML object to retrieve the message list
        AS400Message[] msgs = pcml.getMessageList("qznfrtve");
        for (int i = 0; i < msgs.length; i++)
            System.out.println( msgs[i].getText() );
    }
    // if RC is true, the call to the program worked, and data has been returned
    else
    {
```

FIG. 5B-1

```
int nbrRcds, nbrEnts;
nbrRcds = pcml.getIntValue
    ("qznfrtve.returnedRcdsFdbkInfo.nbrOfNFSExportEntries");
// Loop through array of export definitions
for (rcd[0] = 0; rcd[0] < nbrRcds; rcd[0]++)
{
    .....
    // Get list of R/W Host Names
    nbrEnts = pcml.getIntValue
        ("qznfrtve.receiver.nbrOfReadWriteHostNames",rcd);
    for (index[1] = 0; index[1] < nbrEnts; index[1]++)
    {
        data = (String) pcml.getValue
            ("qznfrtve.receiver.rwAccessList.hostName",
                index);
        System.out.println
            ("Read/write access host name = " + data);
```

FIG. 5B-2

```
        }
            ....
        }
    catch ( PcmlException e )
        {
            // other errors occurred, print the errors
        }
    System.exit(0);
    } // tabs changed to save space
}
```

```
<?xml version="1.0" encoding="US-ASCII"?>
<!DOCTYPE pcml [

<!ELEMENT pcml (struct | program)+>
<!ATTLIST pcml
        version (1.0) #REQUIRED
>

<!ELEMENT struct (data | struct)+>
<!ATTLIST struct
        name      CDATA    #REQUIRED
        usage     (inherit | input | output | inputoutput) "inherit"
        count     CDATA #IMPLIED
        minvrm    CDATA #IMPLIED
        maxvrm    CDATA #IMPLIED
        offset    CDATA #IMPLIED
        offsetfrom CDATA #IMPLIED
        outputsize CDATA #IMPLIED
```

FIG. 6A

```
<!ELEMENT program (data | struct)*>
<!ATTLIST program
    name       CDATA #REQUIRED
    path       CDATA #IMPLIED
    parseorder CDATA #IMPLIED
>

<!ELEMENT data EMPTY>
<!ATTLIST data
    name       CDATA    #IMPLIED
    usage      (inherit | input | output | inputoutput) "inherit"
    count      CDATA    #IMPLIED
    minvrm     CDATA    #IMPLIED
    maxvrm     CDATA    #IMPLIED
    offset     CDATA    #IMPLIED
    offsetfrom CDATA    #IMPLIED
```

FIG. 6B

```
{ type     (char | int | packed | zoned | float | byte | struct) #REQUIRED
  length   CDATA #IMPLIED
B precision CDATA #IMPLIED
  ccsid    CDATA #IMPLIED
  init     CDATA #IMPLIED
  outputsize CDATA #IMPLIED
  struct   CDATA #IMPLIED >
```

FIG. 6C

APPARATUS AND METHOD FOR GENERIC DATA CONVERSION

BACKGROUND OF THE INVENTION

1. Technical Field

This invention generally relates to converting data between formats or types. More specifically, this invention relates to a generic data convertor that uses a data description to convert data.

2. Background Art

Modern computer systems vary in their design and architecture, with many different models available to achieve the desired combination of speed, power and efficiency for any given computing environment. This multitude of different computing environments allows a consumer to select the right computer for a particular job. For instance, an engineering firm might need a computer aided design station, which necessitates a very powerful, fast computer. Meanwhile, a home user might simply want to connect to the Internet to send and receive email, which does not require a fast computer. Thus, the proliferation of different computing environments has,.been beneficial.

There are drawbacks to this multitude of computer systems, however. Because each computer system (and the operating systems on those computer systems) are designed differently, the way that data is actually stored on each computer system may be different. For instance, how an "integer" (a whole number such as 0, 1, 2, etc.) is stored on one computer may be different than how integers are stored on another computer: some computers store integers in a "Little Endian" format, while other computers store them in a "Big Endian" format. Character (letters of the alphabet) data is another common data type that can be stored differently: some computers store characters as ASCII (American Standard Code for Information Interchange) data; other computers use EBCDIC (Extended Binary Coded Decimal Interchange Code) data; and many current computers and operating systems use Unicode. These exemplary differences between the way data is stored on one computer and the way the same data is stored on another computer require that the data be converted into the correct format for the computer or operating system that desires the information.

Data taken or received from one computer will generally be stored (perhaps on the second computer or on a data medium such as a disk) as a series of bytes, words, or double words, depending on the format of the medium holding the data. This data is then converted, usually by a "hard-coded" program, from one format to the proper format required for the computer requesting the data. This program is written to "know" where every data element in the data is and how to convert each data element to the format that the requesting computer requires. Once the data is received or the program is asked to convert the data, the program converts all of the data elements from the format they are in to the format required by the requesting computer. If the data changes in some way, however, the program must be modified or rewritten to deal with the changes. For instance, if the data is the output of a database, and the database is changed to add additional data elements, the program must be modified to know where these new data elements are, what format they are in, and how to convert the data elements to the correct formats. This process of rewriting and modifying data conversion programs can be tedious and time consuming.

This is especially true for dissimilar computers that are connected in a client-server architecture. Many networks have "client-server" architectures that allow many clients to connect to one or more servers. With this architecture comes many benefits. For instance, files and other data may be placed on the server and accessed by the clients; devices such as printers or scanners may be connected to the server and used by the clients; and programs may reside on the server that can be accessed and executed by the clients.

Placing programs on the server is felicitous because servers are typically much faster and have much more storage space than clients. This is important for programs that involve complex calculations or a tremendous amount of data, as servers tend to outperform clients in these applications. In addition, because the data is then generally stored along with the application on the server, the server can provide a convenient and secure location to and from which database information may be accessed. For instance, having airline ticket information stored on the server allows ticketing agencies around the world to determine which seats are open on which flights. By storing the data on the server, data coherency can be more easily maintained, which assures that only one person is sold a ticket for a particular seat.

When the client calls a server program or Application Programming Interface (API), the program or API will usually return a set of values. The number of values that the program or API may return can change. For instance, if the program is returning a list of the available seats on an airline flight, the number of seats can vary from zero (the flight is completely booked) to the capacity of the plane (there have been no seats sold). This may become more complex if the seats are further divided into categories such as isle or window seats, first and second class seats, the type of dinners available, etc. Along with changing the actual data types to reflect the differences in data storage between the client and the server, a client application must also decipher the actual varying length data received from the server program or API. In addition, some servers like to store and send data on "boundaries," meaning that there may be extraneous data at the end of a data set that is there just to ensure that data exists on these boundaries. These extraneous data must be skipped to get to actual data.

Thus, the client application must search through the data received from the server program (or API) and extract the needed information. The server program helps this process somewhat by providing information in the stream of data that it is sending; this information tells the client program a bit about how the data is structured. For instance, the server program might send the number 20 and then 20 seat positions. The number 20 would indicate that there are 20 seats that follow. The client application, upon receiving the "20", would then know that 20 seats follow.

In this manner, client applications can be made to read and convert varying length data returned from server programs. Unfortunately, such applications are, as explained previously, then "hard coded" with the data format and structure. If the data format changes (a different server is used that stores the data differently than the previous server) or if the data structure changes (a third class of seats is added, for instance)+then the application must be modified to adapt to these changes. Modifying applications in this manner can, as stated previously, be very costly and complex.

While allowing computers of different architectures to exchange data provides added speed, security, consumer choice, and connectivity, data conversion between different systems can be problematic. Without a method for allowing easy and quick modifications when data structures or servers change, client and data conversion applications will continue to need to be rewritten to allow for such data changes.

DISCLOSURE OF INVENTION

The preferred embodiments of the present invention provide a method and apparatus for generic data conversion. A generic data convertor interprets a data description that has configurable data definitions that can accommodate changes in the data. The data definitions can allow the data type, character set, location, and length of data elements in the data stream or file to be easily modified. The data convertor uses the data description to determine how to convert the data and, if necessary, where data elements are in the data. The data convertor is particularly useful for converting data that is sent to and/or received from a server. The data convertor and data description cooperate to support calling multiple releases of the server using the same data description. In addition, the data convertor may also call the server program with the correct, converted parameters in the correct order. The data convertor usually waits until a requesting application asks for particular data elements in the data beforeconverting the data elements.

The foregoing and other features and advantages of the present invention will be apparent from the following more particular description of the various preferred embodiments of the invention, as illustrated in the accompanying drawings.

BRIEF DESCRIPTION OF DRAWINGS

The preferred exemplary embodiments of the present invention will hereinafter be described in conjunction with the appended drawings, wherein like designations denote like elements, and:

FIG. 4B is a second portion of an example PCML data description;

FIG. 5A is a portion of an example JAVA program that directs a PCML object to find and convert data;

FIG. 5B is a second portion of an example JAVA program that directs a PCML object to find and convert data; and FIG. 6 is an example DTD that may be used by an XML parser to parse a PCML data description and to produce an output used by a PCML ProgramCallDocument object to find and convert data in accordance with a preferred embodiment of the present invention.

BEST MODE FOR CARRYING OUT THE INVENTION

Figure 1:
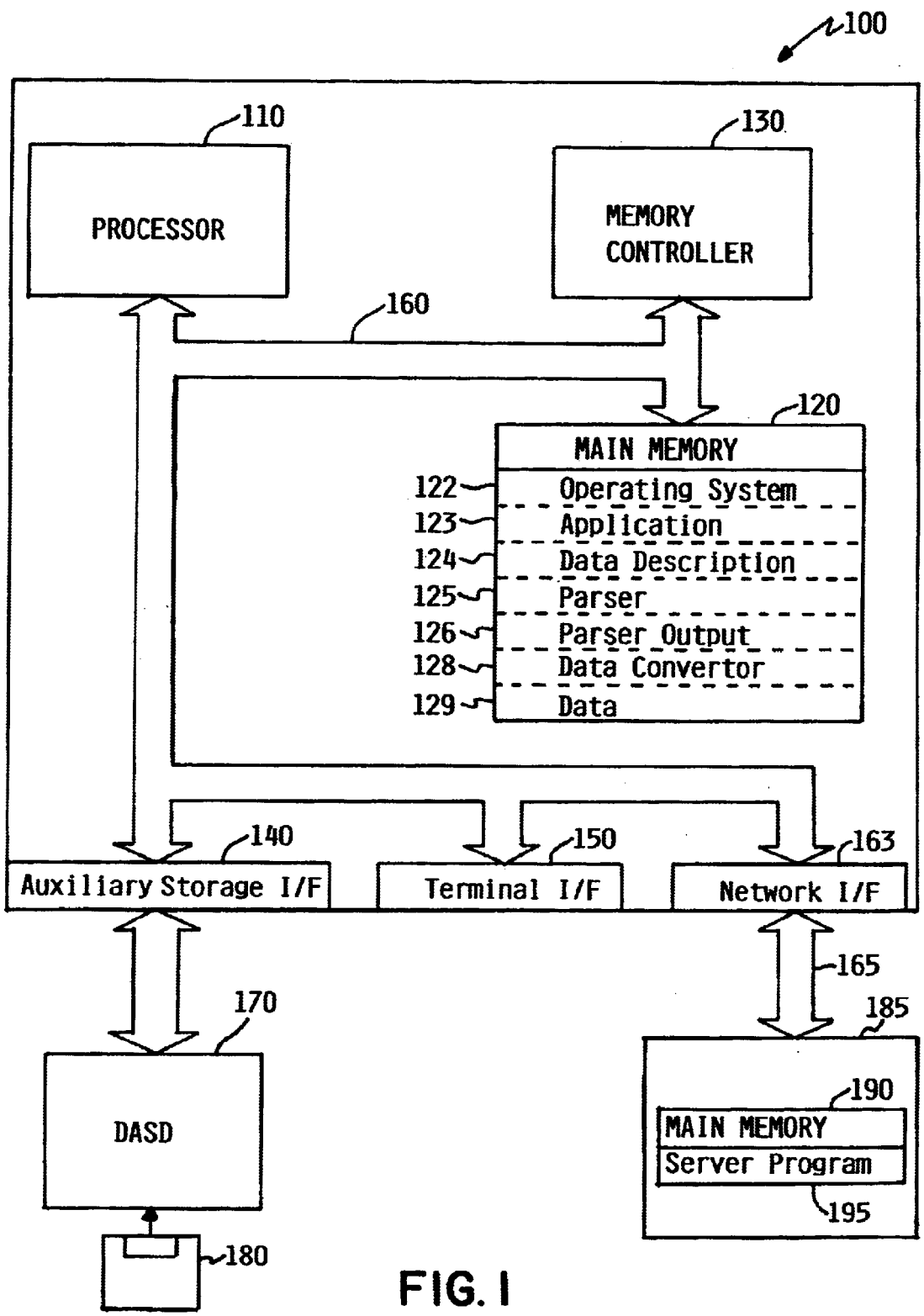
FIG. 1 is a computer system operating with a server in accordance with a preferred embodiment of the present invention.

Although object-oriented programming, Java, and eXtensible Markup Language (XML) are not required for the present invention, a preferred embodiment of the present invention relates to objects, Java, XML. For those individuals who are not generally familiar with these technologies, the Overview section below presents many of the basic concepts and terminology that will help to understand the invention. Individuals skilled in the art of object-oriented programming, Java, and XML may wish to skip this overview and proceed directly to the Detailed Description section of this specification.

Overview—Object-oriented Technology

Object oriented programming based on an object model is a relatively new way of programming computers that has become very popular over the past decade or so. Computer programs written in object-oriented languages are known as object-oriented programs. Object-oriented programming differs from standard procedural programming in that it uses objects, not procedures, as its fundamental building blocks. This difference stems from the fact that the design focus of object-oriented programming technology is wholly different than that of procedural programming technology. The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects.

Conceptually, an object has two parts, an external object interface and internal object data. Internal data is encapsulated by the object interface such that other objects must communicate with that object through its interface. Thus, the only way to retrieve, process or otherwise operate on the encapsulated data is through methods defined on the object. This protects the internal portion of the object from outside tampering. Additionally, because outside objects have no access to the internal implementation, that internal implementation can change without affecting other aspects of the program. The object system thus isolates the requestor of services (clients) from the providers of services by a well defined encapsulating interface.

Data in an object is operated upon by calling "methods" on the object. In the object model, a client object sends a call to the server object system. The call identifies a particular object and specifies what method is to be performed by the object, and provides any parameters required. The object interprets the message to decide what service to perform, and returns back any data that results.

Because all operations on an object are expressed as calls from one object to another, methods can be called by remote objects. Objects that reside in different locations that communicate with each other across a network are called distributed objects in a distributed object system.

Another central concept in object-oriented programming is the class. A class is a template that defines a type of object. A class is defined by a set of class parameters that specify the details of objects that belong to its class. By defining a class, objects can be created that belong to the class without having to rewrite the entire definition. This promotes the reusability of existing definitions and promotes efficient use of program code.

There are many computer languages that support object-oriented programming.

For example, Smalltalk, Object Pascal, C++ and Java are all programming languages that to one degree or another support object-oriented programming. Any of these and others can be used to write programs that use objects.

Overview—Java

Java is a modern object-oriented programming language specially designed to create distributed object systems. Java offers many features and advantages that makes it a desirable programming language to use. First, Java is specifically designed to create small programs, commonly called applets, that can reside on the network in centralized servers, and delivered to the client machine only when needed. Second, Java is completely platform independent. A Java program can be written once and run on any type of platform that contains a Java Virtual Machine (JVM). And third, Java is an object-oriented language, meaning that software written in Java can take advantage of the benefits of object-oriented programming.

A program written in Java is first compiled into bytecodes using the Java Compiler. Bytecodes are platform independent commands that can be interpreted and run by a JVM. The JVM is a virtual computer that must be implemented for each platform on which the Java program must be run. The JVM provides a layer of abstraction between the compiled bytecodes and the underlying hardware platform and operating system.

Java bytecodes include two parts, a one-byte opcode, which is a specific and recognizable command, and zero or more operands which contain the data needed to complete the opcode. When the JVM executes a program it takes the java bytecodes and interprets or converts them to machine code instructions for the underlying hardware, and passes the machine code instructions to the CPU for execution. By working in such a manner, Java programs can be written once and run on any platform for which a JVM is available.

Overview—XML

EXtensible Markup Language (XML) is a subset of Standard Generalized Markup Language (SGML). SGML is an international standard for the description of marked-up electronic texts and is a metalanguage (a means of formally describing a language). SGML specifies what markup is allowed, what markup is required, and how markup is to be distinguished from text. "Markup" generally uses "tags," which are specific words that have particular meanings.

SGML allows a programmer to formulate a set of rules through which a document is to be validated. This formal specification for the structure of an SGML document is called a Document Type Definition (DTD). A parser can then validate the document by using the DTD. A parser is a program that receives input in the form of markup tags and breaks the input into parts that can then be managed by other programs. Validation is a process wherein the grammar, which is defined by the DTD, is checked. If the document validates, the document can be broken into parts that can then be managed by other programs. The DTD is a very powerful part of SGML because the grammar or rules of the language reside in the DTD. The DTD is sent with documents, and thus parsers can immediately understand widely varying documents because the DTD describes the rules for the particular accompanying document.

SGML is a very large standard that has many features that are seldom used in networking environments or the internet. XML is a simpler, yet powerful subset of SGML. XML is currently a formal recommendation from the World Wide Web Consortium. XML is similar to the language of today's Internet pages, HyperText Markup Language (HTML), in that both contain markup symbols to describe the contents of a page or file. XML has broader application, however, because XML describes the content of a file in terms of what the data is. For example, <TVCHANNEL> could indicate that the data that followed was information about a particular television channel. This means that this information could be used (or displayed) by a program for whatever purpose the author had in mind (such as using the information to calculate the number of people who watched the channel on a given night). HTML, by contrast, merely tells a browser how to display information, and not really what the information is and how to use it.

In addition, XML is "extensible" because the markup symbols are unlimited and self-defining (by a DTD created by an author). An XML parser will still use a DTD to validate and parse through a document, producing an output that may then be used by a separate program (such as a web browser). Thus, XML is a flexible way to create information formats and share both the format and the data.

DETAILED DESCRIPTION

The preferred embodiments of the present invention provide a method and apparatus for generic data conversion. A generic data convertor interprets a data description that has configurable data definitions that can accommodate changes in the data. The data definitions can allow the data type, character set, location, and length of data elements in the data stream or file to be described and easily modified. The data convertor uses the data description to determine how to convert the data and, if necessary, where specific data elements are in the data. The data convertor is particularly useful for converting data that is sent to and/or received from a server. The data convertor and data description cooperate to support calling multiple releases of the server, using the same data description. In addition, the data convertor may also call the server program with the correct, converted parameters in the correct order. The data convertor usually waits until a requesting application asks for particular data elements in the data before converting the data elements.

In the most preferred embodiment of the present invention, an eXtensible Markup Languange (XML) parser interprets and parses a Program Call Markup Language (PCML) data description. The PCML data description provides configurable data definitions that are easily changed and that allow the data type, data location, data length, character set, usage, and parameter parse order to be described. In addition, the PCML data description allows configurable data definitions for multiple versions of server programs or Application Programming Interfaces (APIs). The same PCML data definition then can be used when sending data to or receiving data from multiple servers with programs or operating systems of different release levels.

The XML parser produces a parse tree. The data in the parse tree is placed into a hash table and the hash table is sent to a file. When an application requests data conversion on a data file or stream (generally the request is to send data to and call a server program, and receive data from the server program), the data convertor (PCML ProgramCallDocument object) reads in the hash table from the file, and uses the hash table to locate and convert data in the data file or stream. Changing the parse tree to a hash table in this manner allows the hash table to be stored and easily retrieved. Additionally, there is no need for an XML parser to exist on the client or server system during runtime. This has the added benefit of releasing valuable computer: system resources taken by the XML parser.

In general, a software engineer will know the data that needs to be converted from one format or type to another format or type. The data may be very complex. In particular, arrays, structures, or arrays of structures may be contained in the data. Each data element must be located in the data and converted, if necessary, from its current format or type into the correct format or type for the requesting computer. With the current invention, instead of hard-coding a program to find and convert all of these data elements, a software engineer can create a data description that describes the data elements and their interrelationships. The data description is preferably a text file that can be easily manipulated and changed with simple text editors. The data convertor then is a generic program that interprets the data description to locate and convert data elements in the data. Thus, simple changes to the data description are all that is necessary to accommodate even relatively substantial changes in the structure or elements of the data.

The data can be any data that needs to be converted from one format or type to another format or type. The current invention is particularly useful in a client-server architecture, because vast amounts of highly complex and structured data are being transferred between dissimilar computers in this architecture. Applications that are currently hard-coded to convert data between clients and servers can now use the current invention to greatly simplify the coding process for data conversion. The current invention will now be described with reference to a client-server architecture to show the benefits of the current invention in that architecture. However, the current invention is also applicable to any situation where data must be converted between formats and where a generic data convertor that uses or interprets a data description would be beneficial.

Referring now to FIG. 1, a computer system 100 in accordance with a preferred embodiment of the present invention is a single processor, client computer system. However, those skilled in the art will appreciate that the methods and apparatuses of the present invention apply equally to any computer system, regardless of whether the computer system is a complicated multi-user computing apparatus or a single user device such as a personal computer or workstation. In addition, the methods and apparatuses of the preferred embodiments of the present invention apply to non-object-oriented programming and data descriptions not written in XML, but the preferred embodiments will be described in relation to Java (an object-oriented programming language) and XML. Client computer system 100 suitably comprises a processor 110, main memory 120, a memory controller 130, an auxiliary storage interface 140, a terminal interface 150, and a network interface 163, all of which are interconnected via a system bus 160. Note that various modifications, additions, or deletions may be made to client computer system 100 illustrated in FIG. 1 within the scope of the present invention. FIG. 1 is presented to simply illustrate some of the salient features of client computer system 100.

Client 100 communicates through network interface 163 and network 165 with server 185. Network 165 can be any network known to those skilled in the art, such as a wireless, token ring, internet, intranet or wide area network. Server 185 comprises main memory 190 and server program 195. Other features, such as a processor, disk drives, etc., have been left out for simplicity. Server program 195 is a program, one or more Application Programming Interfaces (APIs), an object, an application, or any other element that generates data, which is subsequently sent from the server to a client, and that is called by a client.

Processor 110 of client computer system 100 performs computation and control functions of client computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 may also be any number of separate processors. Processor 110 suitably executes an operating system 122 within main memory 120. Operating system 122 can be any operating system able to run an application and communicate over a network, such as Unix, Linux, OS/2, WINDOWS CE, WINDOWS 95 or 98, etc. Operating system 122 controls the basic functions of client computer system 100.

Preferably running with and being controlled by operating system 122 is an application 123, a data description 124, a parser 125, a parser output 126, a data convertor 128, and data 129. Application 123 is a client application that would like to call server program 195, and send data to and/or receive data from server program 195. Application 123 calls data convertor 128 with the identification of the server program. This identification could be any indication known to those skilled in the art that alerts data convertor 128 that it needs to call a program, application, etc., such as the name of the API or program. Note that, as used herein, the term "program" will encompass any server-based software that can be called by a client and that can return data to a client. Data convertor 128 then calls server program 195 on server 185. Any parameters that are needed for program 195 are converted, ordered, and sent to the program by data convertor 128. Program 195 generates data 129, which in this example has been sent to and received by client 100. The data could be a file, a data stream, an object, a structure or pointer thereto, etc.

Data description 124 preferably describes the input and output data sent to and received from server program 195 and the information necessary to call server program 195. The types and format of data elements, and the relative locations and: lengths of the data elements, should be described. In general, the "type" or "format" of the data element will be the type or format of the data sent to or received from the server. For instance, if Unicode is being transmitted from a client to a server, the data type would be described as EBCDIC (Extended Binary Coded Decimal Interchange Code). Example data types are described in detail below. Data convertor 128 will convert Unicode to EBCDIC before transmitting the data to the server. Similarly, data received from the server will usually be received as a byte stream and will be converted by data convertor 128 from EBCDIC to Unicode. The type of the received data will also be denoted as EBCDIC.: These conversions are necessary because the server stores this information in EBCDIC.

Thus, when the data is received from the server, the format of the data is described by the data description. The data convertor uses the data description to convert the data from EBCDIC to Unicode. There will generally not be a type indication that tells data convertor 128 to convert from EBCDIC to Unicode because data convertor 128 is designed for the current environment and computer. For instance, a JAVA program stores character data as Unicode, while many C++ programs store data as an array of ASCII (American Standard Code for Information Interchange) characters. Because these storage types are preferred for these languages, these will generally be used to store an equivalent type (e.g., characters will be stored as characters). If there are multiple ways of storing the same data (i.e., characters can be stored as String objects in addition to Unicode characters), then a type can be added that indicates the preferred storage type on the client (in addition to the data type of data sent to or received from the server). In this manner, data received from a server could be changed into one of server types, if desired.

The information needed to call server program 195 comprises a parameter list, path to the program on the server, a program identification (or name), and a parameter list order (called a parse order). The parameter list is essentially a list of the input data, generally denoted by name. The input and output data is usually described separately. The parse order is the order that the elements will be sent to server program 195. Data description 124 in this embodiment thus describes the public interface of server program 195. One format for data description 124 will be discussed in detail below.

It should be noted that, when discussing parameters, parameter lists and input/output data, the numbers of parameters and input/output data may vary depending on the server program, and these terms are intended to encompass from zero to a large number of parameters and input/output data. For instance, some server programs may not require any input data or parameters, but will produce output data (and even large amounts of output data). In this case, there will be no input data in data description 124. There will, however, be a potentially extensive description of output data elements and the interrelationship between those elements. There will also be a parameter list, only there will be no input parameters or parse order specified. Similarly, some, server programs may output little, if any, data but may require input data. In this instance, there will be descriptions of input data, a parse order, and a parameter list in data description 124, and only a small amount of descriptions of received data elements and the interrelationship of those data elements.

Parser 125 is optional, but preferred. Parser 125 parses data description 124 and creates parser output 126. Parser output 126 is used by data convertor 128 to call program 195 with the correct input data and to convert the output data (stored in data 129) received from server program 195. Parser 125 in some embodiments will use a separate input file (not shown in FIG. 1) that describes the grammar or rules by which parser 125 will parse data description 124 and create parser output 126. These rules may also be "built in" to parser 125, such as in the example of FIG. 1. While having a separate grammar or rule file is more extensible and thus preferred, a "known" set of rules limits the complexity of the parser and may be preferred in some situations. Parser output 126 may be a data stream, structure, object, etc., that data convertor: 128 uses to determine server program's 195 interface. In particular, the types, lengths, and field relationships of the data in data 129 will be described by parser output 126. This will be discussed in more detail below.

In some situations, it may be advantageous to combine parser 125 and data convertor 128 into a data convertor 128 that performs the functions of parser 125. It may also, in some situations, be preferred that data convertor 128 solely convert data (instead of calling server program 195). In this embodiment, data description 124 would describe the data, its location, length, and field relationships. Data convertor 128 would then convert data upon command from application 123.

It should be noted that the term "data description" is also used herein to refer to parser output 126 and the enhancements on parser output 126 that will be described below. The parser parses the data description and creates a parser output. In enhancements to be discussed below, the information in the parser output is extracted and placed into objects that allow easier and faster access to the information. However, the parser output and the enhancements to the parser output are still data descriptions in that they describe data elements. These objects still describe the length of data elements, the relationship between the data elements (particularly location), the input data to the server program, the parameter list and parse order, etc. Thus, these objects are still data descriptions, only the format of the object has changed. Data convertor 128 can use these objects to determine the location, length, and type of data elements, and the input parameters, parameter list, and parse order needed to call a server program. Data convertor 128 can use the original data description 124 (in its preferable text form), a data description that is the output of a parser (and will usually be in the format of a parse tree), or the data description that is an enhancement of the output of a parser (which will be discussed shortly).

Auxiliary storage interface 140 allows client 100 to store and retrieve information from auxiliary storage devices, such as a magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks (e.g., disk 180) and CD ROMS, and transmission type media such as digital and analog communication links, including wireless communication links.

Memory controller 130 is responsible for control signals to move, store, and retrieve requested data from main memory 120 and/or through auxiliary storage interface 140 to processor 110. While, for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 is an interface that allows external devices, such as mice, monitors, keyboards, etc. to be connected to client 100 and that allows human interface with client 100. Although shown as one block, those skilled in the art will realize that many different components may actually make up terminal interface 150.

FIG. 1 illustrates that using data description 124 to describe the interface to server program 195 allows data convertor 128 to be a generic mechanism that interprets data description 124 and can then convert data received from server program 195 when requested by application 123. Describing interfaces in such a manner allows simple changes to data description 124 if the server program's interface changes. The changes in the data description can accommodate changes made to server program 195,:or can accommodate use of different servers. In addition, as explained in more detail in reference to FIGS. 4A and 4B below, the same data description can be used for multiple servers having different server program or operating system releases. In this manner, instead of re-writing large amounts of "hard coded" software, changes to data description 124 may be made that describe the changes to the output data, the interrelationship between the data, or how the data is to be converted. In addition, changes to input data and how the data is to be converted or the input parameter list used to call a server program may also be easily and conveniently updated.

Figure 2:
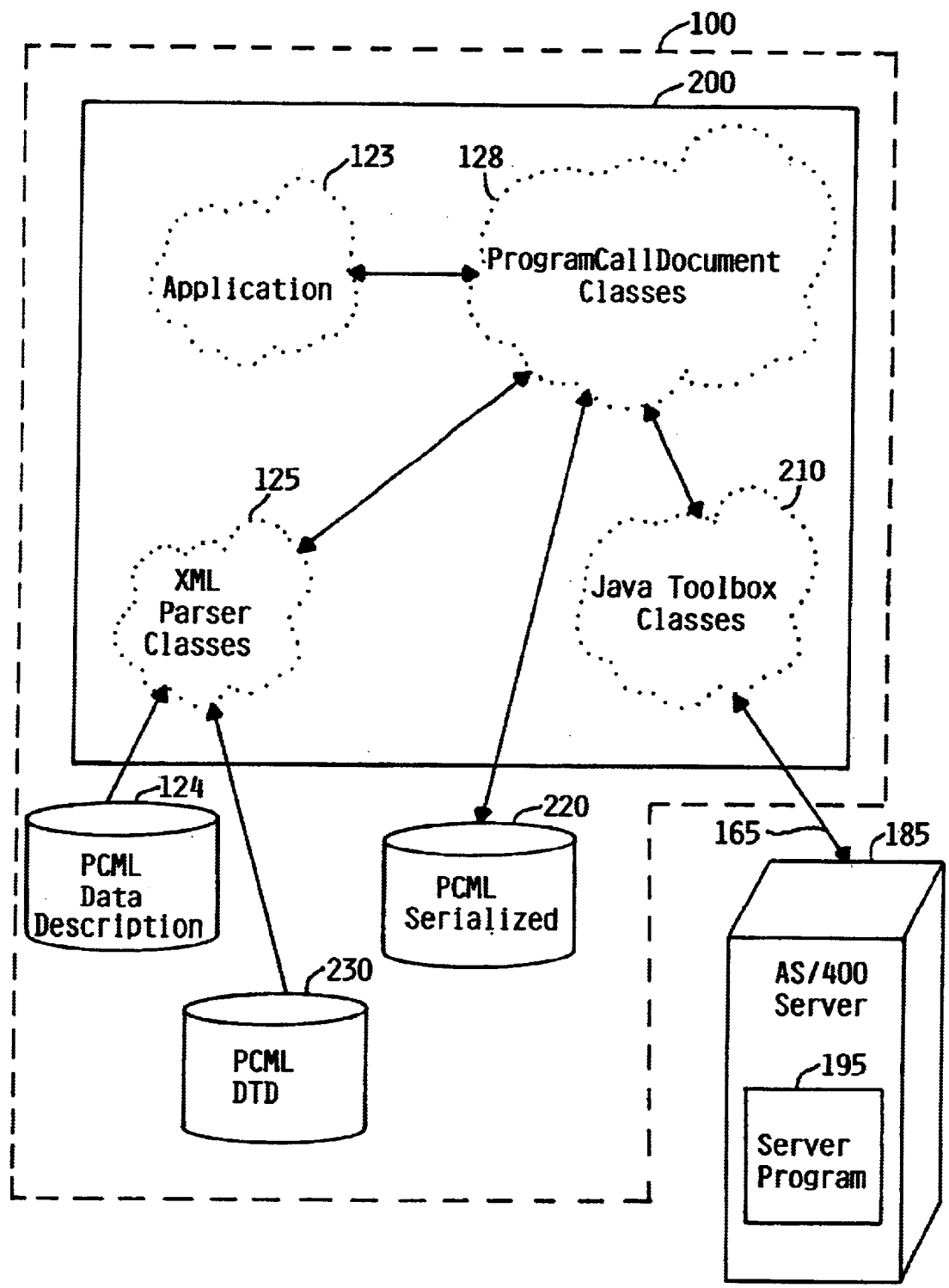
FIG. 2 is an object-style block diagram of a second preferred embodiment of the present invention.

Turning now to FIG. 2, a particular embodiment of the present invention is shown that has been implemented in JAVA. FIG. 2 is a combination object and block diagram that illustrates the major elements from FIG. 1 along with additional elements for this particular embodiment. In this embodiment, a Program Call Markup Language (PCML) is implemented that is used to describe the interface for server program 195. The PCML document is the "original" version of data description 124, which is a text file. The PCML follows the rules for XML and an XML parser is used to parse through a data description 124 written in PCML. Thus, parser 125 is a set of XML parser classes. Data convertor 128 (as a ProgramCallDocument class or object) then operates on the output of the XML parser to determine how to find and convert data received from server 185, convert and send data to program 195, and call program 195. Program 195 is on a server, which in this example is an AS/400 server.

Client computer system 100 in this embodiment comprises JAVA Virtual Machine (VM) 200, PCML data description 124, PCML ProgramCallDocument Type Definition (DTD) 230, and PCML Serialized 220 (if used). Java environment 200 comprises application 123, data convertor 128 that has been implemented as a ProgramCallDocument JAVA class or classes, XML parser classes 125, and JAVA toolbox classes 210. Even though various constituent parts will be referred to as "classes," those skilled in the art will realize that these parts are actually instantiations of classes, and are thus objects. Client 100 communicates through network 165 with AS/400 server 185 that comprises server program 195. Server program 195 may be an API, object, program, etc., that is called by ProgramCallDocument class 128 and that returns data to client 100 (data 129 is not shown in FIG. 2). It should be noted that all elements shown in FIG. 2, other than the application, can actually reside on server 185. The application on the computer system 100 would remotely call the ProgramCallDocument class on the server 185. The data elements would not be received by computer system 100, and would instead be converted by ProgramCallDocument classes 128 (at server 185) and sent to computer system 100 when the application requests these data elements.

XML parser 125 parses and validates PCML data description 124 by using PCML DTD 230, which provides the grammar or rules associated with PCML. PCML Serialized 220 is an enhancement to the parser output, and this enhancement will be discussed below. XML parser 125 produces an output object (not shown in FIG. 2) that ProgramCallDocument class 128 uses to call server program 185. The exact type and description of the output object(s) depends on the XML parser being used. For instance, many XML parsers output a "parse tree," which contains many "nodes" that can be traversed. Traversing the nodes of a parse tree and working with parse trees are well known in the art. Java toolbox classes 210 are classes that do the actual communication between client 100 and AS/400 server 185. In particular, these classes will determine and use the correct network protocol (if used) that is necessary to communicate between the two computers. Java toolbox classes 210 may also do some format conversions, such as conversions between Little Endian and Big Endian or between character, integer, or floating point data. Java toolbox classes 210 are directed to perform these actions by ProgramCallDocument class 128.

Thus, application 123 calls ProgramCallDocument class 128 with instructions to call server program 195 on AS/400 185. ProgramCallDocument class 128 uses Java toolbox classes 210 and the output (not shown in FIG. 2) of XML parser 125 to call server program 195 and to receive data (not shown in FIG. 2) from server program 195. This data is then converted and parsed by ProgramCallDocument class 128 when application 123 requests the data.

Although what has been described is a preferred apparatus, there are enhancements that help speed and provide better memory usage. For instance, traversing the parse tree produced by XML parser 125 is a time-consuming process. An enhancement to this situation is provided by traversing the parse tree one time after it has been created, extracting the information in the parse tree, and placin the information into a hash table (which is a well known JAVA object). Accessing the hash table is fast compared to accessing a particular node of the parse tree. Furthermore, the XML parser and parse tree can use a lot of memory. If the XML parser is not used during runtime, this saves quite a few resources (mainly memory resources). In addition, serializing the hash table, and parts of the ProgramCallDocument classes, to create PCML serialized 220 is a further enhancement. Serialization is a process, well known to those skilled in the art, to create a persistent object that is generally recorded to a file as a byte stream. This file can be opened, read, and then "rehydrated" back into its constituent objects and classes. This is the most preferred embodiment of the present invention, because the hash table is then a file that can be accessed at any time, without the need for an XML parser.

The apparatus shown in FIG. 2 for the latter case would not contain XML parser 125, PCML data description 124, or PCML DTD 230. Instead, a software engineer who is writing a PCML data description for a particular API or program (server program 195) would write the PCML data description 124, call the ProgramCallDocumentClass constructor, which would call the XML Parser classes 125. The XML parser classes 125 would use the PCML data description 124 and the PCML DTD to create a parser output object. The ProgramCallDocument class then would extract the information from the parser output object and place it into a hash table. The hash table (and any needed ProgramCallDocument classes/objects) would then be serialized by the ProgramCallDocument class into PCML Serialized 220. Some time later, when the application requests a call to server program 195, the ProgramCallDocument class then would rehydrate the PCML serialized object 220. The ProgramCallDocument class would use the PCML serialized object 220 as the data description that would enable the ProgramCallDocument class to determine the type, location, and length of data received from server program 195, and the input data value, input data type, parse order, and parameter list used to call server program 195. The hash table, which essentially takes a string description of a data element and returns a reference to the object (data element), and serialized data description are enhancements that improve speed and decrease memory usage.

Figure 3A:
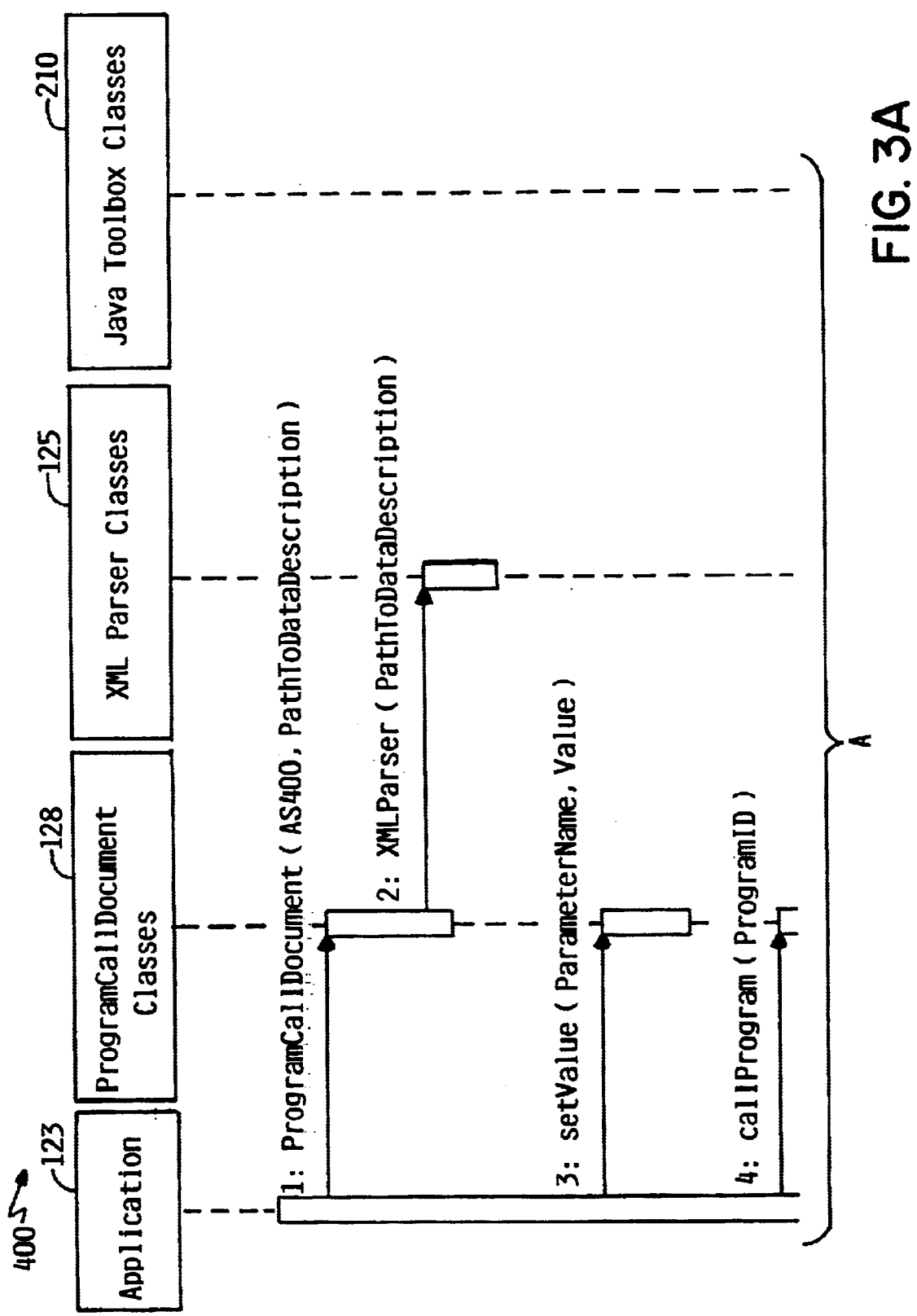
FIG. 3 is a class sequence diagram for calling a server program and converting the returned data from the program for a preferred embodiment of the present invention.
Figure 3B:
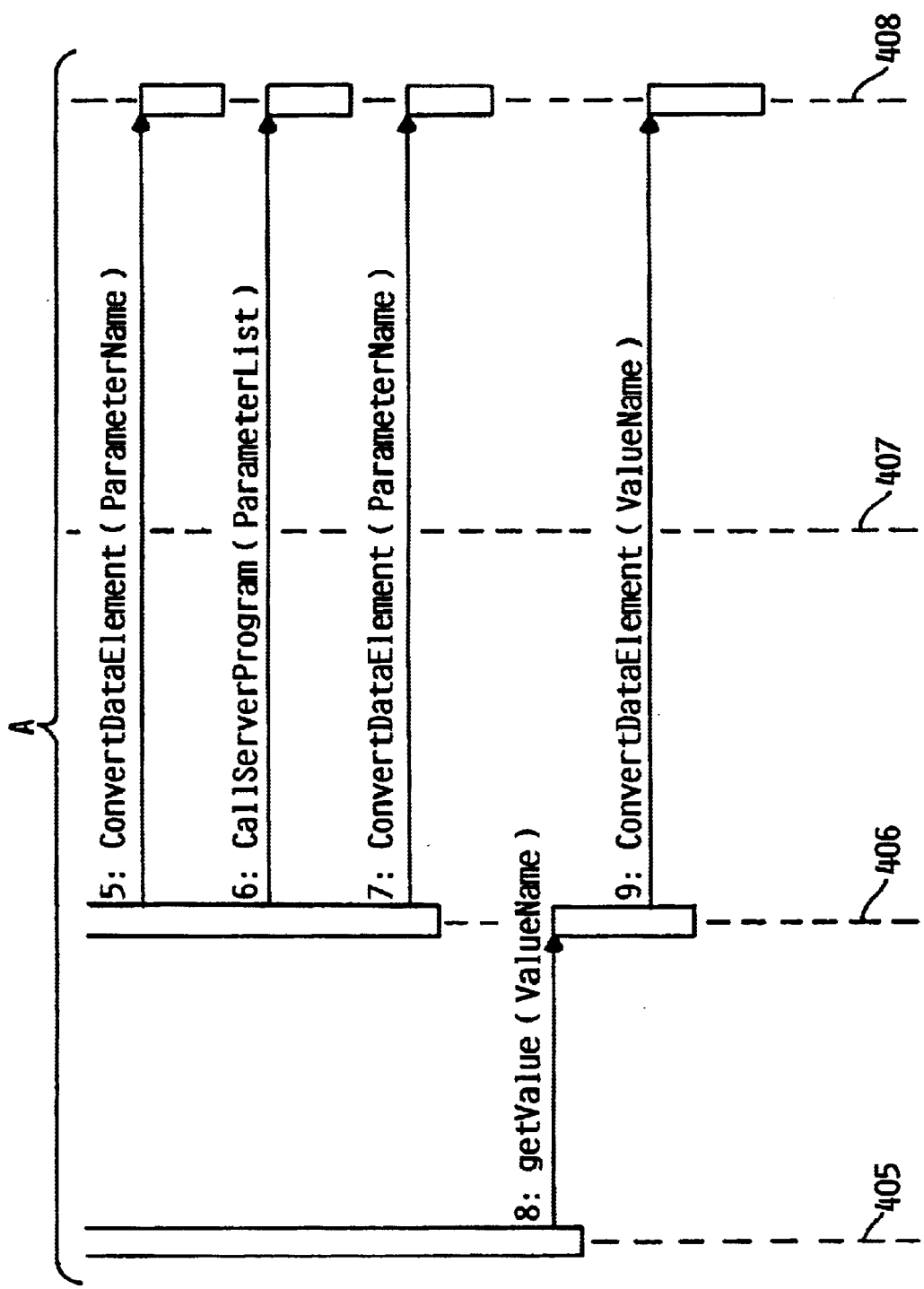

Turning now to FIG. 3, a class sequence diagram for calling a server program and converting the returned data from the program for a preferred embodiment of the present invention is shown. Class sequence diagram 400 illustrates the classes and methods that are called and the order in which they are called for a simple example. In this example, the JAVA implementation of the current invention that is shown in FIG. 2 is illustrated. Class sequence diagram 400 has four sets of classes (application 123, ProgramCallDocument classes 128, XML parser classes 125, and Java toolbox classes 210) and illustrates some of the interaction between these classes. Primarily, some of the public interfaces to these classes are shown. Application 123 is calling Program- CallDocument class (the data convertor in this example) 128 to call a server program (the class for this is not shown). The ProgramCallDocument class uses the XML parser class (the parser for this example) 125 to parse a data description (not shown in FIG. 3). The ProgramCallDocument class also uses JAVA toolbox classes 210 to actually call the server program and to perform some conversion, such as from EBCDIC to Unicode, Little Endian to Big Endian, etc. Lines 405–408 are reference lines to help indicate which class has which method.

Application 123 first calls the constructor for ProgramCallDocument 128 in the first method call. A server object (AS400) and the path to and name of the data description are passed to the constructor in this example. This step constructs a ProgramCallDocument object. Note that the constructor at this point has two choices. The constructor first looks for a serialized file then looks for a source file. If, as discussed with reference to FIG. 2, the data description (written in PCML) has been serialized, the constructor would then rehydrate the serialized data and classes (by opening/reading the file, calling serialization classes, etc.). The steps and classes involved with serialization and re-hydrating are not shown in FIG. 3. If the ProgramCallDocument determines that a source data description (e.g., a text file that has not been parsed) has been handed it, then the data description will be parsed.

Public classes of the XML parser class 125 will then be called by the ProgramCallDocument class 128 in the second step. The XML parser classes 125 will parse the data description and create a parse tree output. The ProgramCallDocument class 128 will extract information from the parse tree by using statements or private classes/methods (not shown in FIG. 3). This entails calling XML parser classes 125 many times to extract the node information. For simplicity, only one call to an XML parser class is shown on FIG. 3. The information is placed into a hash table object, which accepts a string object and returns a reference to the object represented by the string. Use of a hash table object is described below. After the hash table is created, the ProgramCallDocument class has the classes and information necessary to determine the location of data elements in data, the length and types of the data elements, and the input data types and initial values, parameter lists, and parse order used to call a server program.

What is preferred from a speed and memory usage standpoint is that the hash table and ProgramCallDocument classes be serialized at this point and saved to a file. Then, when the ProgramCallDocument class constructor is called, the overhead involved with the XML parser will not occur because the constructor will rehydrate the serialized hash table and other classes, and all of the traversing of the parse tree and placing data into a hash table has already been performed. This has the added benefit that an XML parser is not necessary for the runtime (or execution time) invention (but is necessary at "compile" time).

The application then may set values for the input parameters that will be passed to the server program. To set values of parameters, the application calls the setValue method (step 3) on the ProgramCallDocument object, passing this method the name of the parameter and the value to assign the parameter. Although not shown in the simple example of FIG. 3, the application could call the setValue method many times if there are many parameters. The application then calls the callProgram method, passing some type of identification to the ProgramCallDocument class indicating which server program is to be called. ProgramCallDocument (PCD) class 128 then uses the data description (XML parser output that has been placed into a hash table object) to convert input data into the type required for the server. PCD class 128 does this by calling classes on the JAVA toolbox Class object that has been previously created. For example, Unicode could be converted to EBCDIC (or ASCII); Little Endian could be converted to Big Endian, floating point or double could be converted to floating point (with the correct number of bits); and Java BigDecimal could be converted to packed decimal or zoned decimal. These types of conversions are illustrated by step 5, "ConvertDataElement ( )", which is an example of a JAVA toolbox class.

The data convertor (PCD class) 128 would then use the data description to send the input data in the correct order to the server program (not shown in FIG. 4). This occurs when the application calls the callProgram ( ) method on the PCD class. The PCD class causes the server program to run and produce an output that is sent to the client. The PCD invokes the program (and sends data to the server program) by using various methods on the JAVA toolbox classes 210. Only one call to a method is shown for simplicity.

Some of the data elements that are returned by the server are converted here if desired. Preferably, the data description has already been parsed into a hash table, which already exists (and has been rehydrated from serialized input) and is essentially a "dictionary" of all the named elements. Thus, a string object is passed to the hash table, which then returns a reference to the object represented by the string object. To adequately determine where the data elements are in the returned data, some offsets and other data elements that describe the interrelationship between other data elements may be converted at this stage.

The application will then request one or more data elements from the received data. To request an element, the application calls the getValue method on the ProgramCallDocument class. The ProgramCallDocument class retrieves the element from the received data by using the parser output and converts this data by calling any of a number of conversion classes on the JAVA toolbox. Although complex structures and arrays (or arrays of structures) can be converted and located using the current invention, in general the elements of the structures will only be converted when the application requests them. Thus, the application would need to make multiple calls to the PCD class to convert all elements of an array or structure. One call per element in the array is generally needed. This has the advantage that the conversion is performed "just-in-time", which should be faster because unused or undesired data will not be converted. This is in marked contrast to "hard-coded" conversion programs, which convert all data whether requested or not.

If a complex set of arrays or structures is being converted, the getvalue method can convert offsets at this point to determine the location of data. For instance, if data element "A" is a variable length structure and is before data element "B" in a data stream, the length of A may be determined first before accessing element B. In this manner, the length of A and A's starting point will be known. From this information, B: can be found.

Figures 1, 4A:
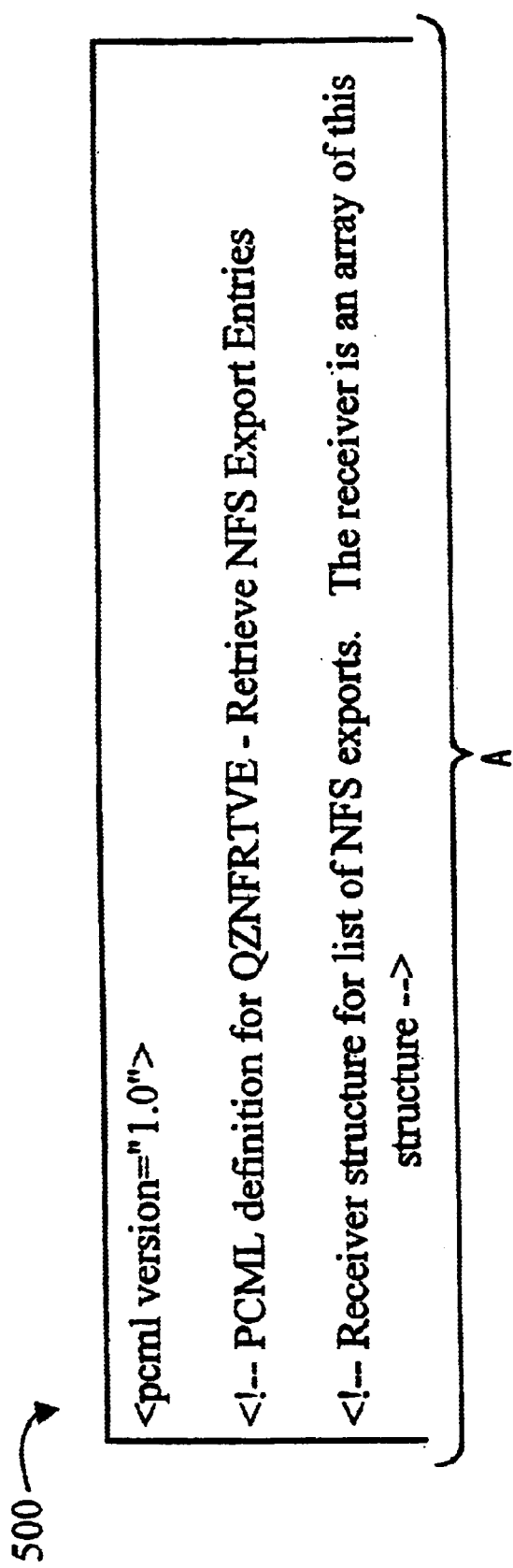
FIG. 4A is a portion of an example PCML data description.

Turning now to FIGS. 4 (split into FIGS. 4A and 4B), and 5 (split into FIGS. 5A, and 5B), in FIG. 4 an example portion of a PCML data description 500 is shown. FIG. 5 shows a JAVA program that uses a ProgramCallDocument object to call a server program and to receive data elements from the server program. The ProgramCallDocument, as previously discussed, uses a PCML data description to call a server program and find and convert the data received from the program. The PCML data description is, parsed by an XML parser, and the output of the XML parser (generally in the form of a parse tree with nodes that can be negotiated) may be used by the ProgramCallDocument object to call the server program and find/convert the data. Preferably, the XML output is extracted and placed in a hash table and serialized, as this provides a performance boost and does not require that an XML parser exist on the server or client.

FIG. 4 shows a portion of a PCML data description 500. It should be noted that PCML and its associated tags are described in detail below, but some short descriptions of tags will be made here while discussing the data description. PCML data description 500 is a data description for an AS/400 Application Programming Interface (API) called "qznfrtve". This API retrieves Network File System (NFS) export entries (which essentially represents a shared storage resource), and its interface is described in detail in AS/400 API references. Only a portion of the interface has been placed into FIG. 4 for clarity and understanding. Some of the data entries in the PCML data description 500 have been labeled for ease of narration. As stated previously, a PCML ProgramCallDocument uses tags to preferably describe input parameters, output parameters, and how these parameters are structured for calling and receiving data from a program or API. FIG. 4A shows definitions for data, while FIG. 4B shows the definition for the API qznfrtve referencing the previously defined data.

In FIG. 4A, PCML data description 500 contains a description of a receiver structure 510 that has a variety of data elements such as "lengthOfEntry", "dispToObjectPathName", etc. After each data name are a variety of descriptions of the data element that goes by that name. For instance, the lengthOfEntry is an integer having a length of four bytes. Similarly, dispToObjectPathName is also an integer with a length of four bytes. Data element pathName 540, however, is a character string that has a variable length. The length of the string is the number "lengthOfObjectPathName", which is described as being a four-byte integer. The value of lengthOfObjectPathName will be determined after the API qznfrtve has been called and the server has sent the data from the API to the calling computer. The ProgramCallDocument will then use lengthOfObjectPathName to determine the length (number of bytes in this example) of pathName. Note that bytes is the data size into which the data elements are divided, but this could be changed if necessary.

Among these elements in the receiver structure is another structure, the rwAccessList structure 550. This structure is itself made of other elements, such as lengthOfostNameEntry (a four-byte integer). The definitions at the beginning of the rwAccessList structure 550 indicate that this structure is offset from receiver structure 510, that it is an array having nbrOfReadWritellostNames elements, and that rwAccessList is offset from the beginning of the receiver structure 510 by the number "dispToReadWriteHostNames". Using offsets in this manner allows nested structures that have variable starting locations and lengths.

At the end of the rwAccessList structure 550 is a data type 560 that is used to skip a certain amount of space. Because some servers will keep structures and other data on boundaries, some of the space at the end of the bounded memory may not be used but may be sent. For instance, if rwAccessList structure 510 uses 1000 bytes total, but the AS/400 keeps the structure on a 1024 byte boundary, then 1024 bytes would be allocated to the structure. Often, a server will send the entire 1024 bytes instead of determining where the structure actually ends and only sending the structure. For these cases, data type tag 560 allows the reserved, but not used, space to be skipped. The amount of space skipped in this instance is given by the offset "lengthOfHostNameEntry" (in bytes). Similarly, receiver structure 510 has a data type 570 element at the end of its definition that skips a number of bytes determined by the offset "lengthOfEntry".

FIG. 4A ends with a returnedRecdsFdbkInfo structure 520 having five, four-byte integers. FIG. 4A illustrates that structures and data types can be accurately and adequately described with very high detail.

FIG. 4B shows the end of the PCML data description 500. The "<program>" tags demarcate input and output data for the program "qznfrtve". For instance, the structure receiver 510 is an output data structure that is an array having a dimension of "retumedRcdsFdbkInfo.nbrOfNFSExportEntries". Note that the latter is written in "structure name.data name" format. This makes it relatively easy for a ProgramCallDocument object to get the necessary information by using the hash table, as the hash table is a dictionary of all of the named elements of the returned data (as defined by the data description). If desired, the ProgramCallDocument object can also use this definition to negotiate through the parse tree produced by the XML parser. The "nodes" of the parse tree will generally correspond to the elements making the definition. The hash table method is more desirable because the traversing of the parse tree and the placing of data from the tree into a hash table has already been done. Additionally, this allows serialization of the hash table, which means that an XML parser need not be installed on the client or server at run-time (although use of a parser is preferred at compile-time) and means that the substantial cost of parsing the parse tree will have already been performed.

The input data can have initial values, if this is beneficial. In addition, the input values may also be assigned by calling setValue ( ) on ProgramCallDocument (as explained in reference to FIG. 3). Furthermore, the parse order is specified for this API: the returnedRcdsFdbkInfo structure should be received by the server program before the receiver structure is received. In this instance, this is needed because the feedback structure (returnedRcdsFdbkInfo) contains the integer value for the dimension of the receiver structure.

Two important advantages of the data description and the current invention are the ability to dynamically (or statically) convert character sets and the ability to add conversions for data at various release levels of the server program. Converting character sets is not shown in FIGS. 4A and 4B. Concerning converting character sets; if the data element hostName in structure 550 is in Spanish, a 'ccsid="10"' description could be added to the description of hostName. This would inform the data convertor that a character set identification of "10" is used to convert the character data to Unicode (if JAVA is used). The data converter will use a code page for Spanish that allows the data convertor to know what language the characters are in the data and what and how to convert them to the equivalent language in Unicode. If the hostName is in Spanish, the data convertor will convert the characters, using a code page for Spanish, to Spanish in Unicode. Additionally, an integer in the received data could determine the language of the data. For instance, if 'ccsid="ccsidValue"' is added to the definition for hostName, then the data convertor will examine the integer ccsidValue (converting this integer, if necessary) to determine the language of the character data. If the integer ccsidValue is "10", then the data convertor will convert the received characters from Spanish to the Unicode equivalents as described above. If the integer ccsidValue is "11", a different language is specified, and the data converter will use this language in conversion. Thus, the data convertor and data description have the ability to dynamically (or statically) convert character sets.

Concerning conversions for data at various release levels of the server program, the data converter and data description provide the ability to use the same data description for multiple versions of server programs. A simple example of this is shown in FIG. 4A. Assume that a client is connected to two AS/400 servers (server A and server B) running two different releases of operating systems (server A is running OS/400 "v1r1m1", which is a preferred description indicating "version one, release one, modification one"; and server B is running OS/400 "v2r1m1", which is a preferred description indicating "version two, release one, modification one"). Also assume that, in FIG. 4A, data element hostName of structure 550 had a fixed length of 20 bytes in v1r1m1through v1r255m255 ("version one, release 255, modification 255") of OS/400. This data description is shown as data definition 562, which indicates that hostName has a fixed length of 20 bytes for all releases (1 to 255) and modifications (1 to 255) of version one of OS/400. In all modifications and releases of version two (v2r1m1) of OS/400, the data element hostName had a variable length indicated by "lengthOfHostName", as shown in data definition 561. Note that the "minvrm" and "maxvrn" describe a range of release levels. Furthermore, even if only one of these is used, this still describes a range of release levels. For instance, the line 'minvrm="v1r1m1"' states that the minimum release level of the program is v1r1m1, but any release level above this is also valid.

When the data converter converts the data element hostName before transmission to or after reception from server A (having a release level of v1r1m1), then data definition 561 will be used for hostName instead of data definition 562. Thus, a fixed length of 20 bytes of data will be sent or received from server A. Conversely, when the data converter converts the data element hostName before transmission to or after reception from server B (having a release level of v2r1m1), then data definition 562 will be used for hostName instead of data definition 561. Thus, a variable number of bytes of data, as indicated by the integer lengthOfostName, will be sent or received from server B.

Thus, the same data definition is used to describe data received from and sent to different releases of the server program or API. This is extremely powerful, as it allows one data description to be written with configurable data definitions having varying release levels to accommodate changes in the server's interface with each server release.

FIG. 4 illustrates that a data description is a detailed document that describes a server program's interface, including input data, output data, and parse order. Any data can be similarly described and converted by the current invention. Nested structures of varying length can be accommodated by a data description, yet the description may be easily changed if the input data, output data, or parse order changes. Thus, the data description can be written with configurable data definitions that can accommodate varying release levels, data types, character sets, locations, and lengths.

Turning now to FIG. 5 (split into FIGS. 5A and 5B), an example JAVA program that creates and calls a ProgramCallDocument object is shown. In FIG. 5A, the JAVA program uses the ProgramCallDocument object to call the server API qznfrive, whose data description was just discussed. The JAVA program first creates an AS400 object in step 610. The AS400 object allows one particular user (identified by userName and userpassword) to log into one particular AS400 (identified by systemName). Then, the JAVA program attempts to create a ProgramCallDocument object named "pcm1" in steps 620. If an error occurs during construction of the pcml object, the error is caught an output to the screen. In addition, after the pcml object has been created, additional errors can occur during calls to the pcml object. These errors should also be caught.

Once the pcml object has been successfully created, the JAVA program attempts to call the qznfrtve program on the server by calling the pcml.callProgram ( ) method. This occurs in steps 630 and 650 of FIG. 5B. Step 650 is a call to the method, while steps 630 are the try/catch statements that catch errors if the try fails. If an error occurs during the call to the server API, errors are caught and print to the screen. If there are no errors during the method call, there still may be other errors that the server sends to the client. The pcml.callProgram ( ) method returns a boolean that indicates that an error has occurred. The errors themselves are returned as an array of AS400 message objects.

If the server did not return any errors, the JAVA program can call the pcml object, which will "search" through the data received from the server API. The pcml object "searches" by using the output of an XML parser that has already parsed the data description of FIG. 4. The parser output has been placed into a hash table and the hash table serialized and then reconstituted. This is described above. For instance, in step 670 the JAVA program attempts to retrieve the number of NFS export entries ("nbrOfNFSExportEntries") from the received data by calling the method "getIntValue". The value name lists the API "qznfrtve", followed by the structure ("retumedRcdsFdbkInfo"), followed by the data element ("nbrOfNFSExportEntries"). A shown in FIG. 4A, the PCML data description 500 defines this structure as having a four-byte integer ("nbrOfNFSExportEntries") as its third element. Because the parse order for the structures is known, the structures and their elements are known, and the sizes and locations of the elements are known, the pcml object can use the XML parser's output to quickly find the element that is requested by JAVA program. Although a parse tree could be traversed at runtime, in the most preferred embodiment, the hash table already has a dictionary of data elements and references to these elements. The data converter merely passes a string to the hash table, and the hash table returns a reference to the object. Once the element is found, the pcml object can use the data description to determine the type of the data (i.e., integer, floating point, character string, packed, zoned etc.) and other characteristics of the data (i.e., signed, unsigned, precision, etc.). Using these descriptions, the pcml object can then convert the data element from its current form into that used by the receiving computer. For instance, a data value that is currently a 16-bit unsigned value could be converted into a 32-bit signed integer (as a java.lang.Integer); a 31-bit signed value could also be converted into a 32-bit signed integer (as a java.lang.Integer); and an EBCDIC series of characters could be converted into a String object (as a java.lang.String object).

It should be noted that the pcml object does not perform conversion until requested by the JAVA program. While the ProgramCallDocument class (from which the pcml object has been instantiated) could be designed to convert all received data immediately, waiting to convert or search provides the benefit of reduced conversion and searching for those instances where all the data is not used by the JAVA program.

After the four-byte integer ("nbrOfNFSExportEntries") has been converted and retrieved, the example JAVA program uses this value to loop through the export definitions and to retrieve information for each NFS export, some of which are R/W host names. The R/W host names are a list of computers that are granted read/write access to the resource being shared by the NFS export entry. First, the number of R/W host names is retrieved by directing the pcml object to search for, convert, and retrieve the four-byte integer indicating the number of read/write host names ("nbrOfReadWriteHostNames; see FIG. 4A for this definition) that is an element of the "receiver" structure, which was received from the "qznfrtve" server API. This occurs in step 680. This number is used to retrieve the actual host names in step 690. In step 690, the JAVA program directs the pcml object to retrieve and convert each host name (hostName, which is character data as defined by the data description of FIG. 4A) from the structure "rwAccessList", which is itself part of the structure "receiver".

Thus, FIGS. 5 and 6 show how a data description is used to define the interface for a server program or API, and how a JAVA program can direct a ProgramCallDocument object to retrieve and convert particular data elements in the data or data stream received from the server program/API and to convert and order data parameters that are sent to the server program/API.

Turning now to FIG. 6, a description of the Document Type Definition (DTD) for the PCML is shown. As stated previously in the Overview section, XML allows a programmer to formulate a set of rules through which a document is to be validated. This formal specification for the structure of an XML document is called a Document Type Definition (DTD). A parser can then validate and parse the document by using the DTD. The DTD is a very powerful part of XML because the grammar or rules of the language reside in the DTD. The DTD is sent with documents, and thus parsers can immediately understand widely varying documents because the DTD describes the rules for the particular accompanying document.

XML and the DTD of FIG. 6 are used in a preferred embodiment of the present invention to allow a data description to easily describe the interface of a server program. The data description can then be modified when necessary to encompass changes in the interface of the program. The DTD provides the grammar of the PCML that is used by an XML parser to parse through a data description. A diagram of an XML parser using a DTD to parse through a PCML data description was shown previously in FIG. 2.

The following table contains a list of all the tags associated with the PCML of one embodiment of the present invention. The PCML comprises the following tags. The tags "<program>" and "</program>", which encapsulate the definition of a single program. A <program> tag contains one <data> or <struct> tag for each parameter of the program. The tags "<struct>" and "</struct>", which define a named structure that can be specified as an argument to a program or as a field within another named structure. A <struct> tag contains one <data> or <struct> tag for each field in the structure. The "<data>" tag, which defines a field within <program> or <struct>. The table is divided into each major tag. After each major tag, the tag's syntax, complete with required and optional attributes and values, is shown. This is followed by a detailed listing of the attributes and values.

The <program> Tag

```
<program name="name"
    [ path="path-name"] >
    [ parseorder="name-list"] >
</program>
```

| Attribute | Value | Description |
|---|---|---|
| name= | "name" | Specifies the name of the program. |
| path= | "path-name" | Specifies the path to the program object. The default value is to search the job's library list for the program. |
| parseorder= | "name-list" | Specifies the order in which output parameters will be processed. The value specified is a blank separated list of names of the parameters in the order in which they are to be processed. The names in the list must be identical to the names specified on the name=attribute of tags belonging to this <program> The default value is to process output parameters in the order the tags appear in the document. Some programs return information in one parameter that describes information in a previous parameter. For example, assume a program returns an array of structures in the first parameter and the number of entries in the array in the second parameter. In this case, the second parameter must be processed in order for PCML to determine the number of structures to process in the first parameter. |

The <struct> Tag

```
<struct name="name"
    [ count="{ number | data-name }" ]
    [ maxvrm="version-string" ]
    [ minvrm="version-string" ]
    [ offset="{ number | data-name }" ]
    [ offsetfrom="{ number | data-name | struct-name }" ]
    [ outputsize="{ number | data-name }" ]
    [ usage="{ inherit | input | output | inputoutput }" ]
>
<struct>
```

| Attribute | Value | Description |
|---|---|---|
| name= | "name" | Specifies the name of this <struct> element |
| count= | "number" \| "data-name" | Specifies that this element is an array and identifies the number of entries in the array. If a number is specified, it defines a fixed sized array. That is, the number of elements in the array never changes. If a data-name is specified, it defines the name of a <data> element within the PCML document that will contain, at runtime, the number of elements in the array. The data-name specified can be a fully qualified name or a name that is relative to the current element. In either case, the name must reference a <data> element that is defined with type="int". If this attribute is omitted, this element is not defined as an array, although it may be contained within another element that is defined as an array. |
| maxvrm= | "version-string" | Specifies the lowest OS/400 version on which this element exists. If the OS/400 version is less than the version specified on this attribute, this element and its children, if any exist, will not be processed during a call to a program. This attribute is helpful for defining program interfaces which differ between releases of OS/400. The syntax of the version string must be "VvRrMm", where the capitals letters "V", "R" and "M" are literal characters and "v", "r" and "m" are one or more digits representing the version, release and modification level, respectively. The value |

-continued

| | | |
|---|---|---|
| | | for "v" must be from 1 to 255 inclusive. The value for "r" and "m" must be from 0 to 255, inclusive. |
| offset= | "number" \| "data-name" | Specifies the offset to this <struct> element within an output parameter. Some programs return information with a fixed structure followed by one or more variable length fields or structures. In this case, the location of a variable length element is usually specified as an offset or displacement within the parameter. This attribute is used to describe the offset to this <struct> element. If a number is specified, it defines a fixed offset. That is, the offset to this element never changes. If a data-name is specified, it defines the name of a <data> element within the PCML document that will contain, at runtime, the offset to this element. The data-name specified can be a fully qualified name or a name that is relative to the current element. In either case, the name must reference a <data> element that is defined with type="int". This attribute is used in conjunction with the offsetfrom attribute. If the offsetfrom attribute is not specified, the base location for the offset specified on the offset attribute is the parent of this element. The offset and offsetfrom attributes are only used to process output data from a program. These attributes do not control the offset or displacement of input data. If this attribute is omitted, the location of the data for this element is immediately following the preceding element in the parameter, if any. |
| offsetfrom= | "number" \| "data-name" "struct-name" | Specifies the base location from which the offset attribute is relative. If a number is specified, it defines a fixed base location. That is, the base location to this element never changes. This is most typically used to specify number="0" indicating that the offset is an absolute offset from the beginning of the parameter. If a data-name or struct-name is specified, it defines the name of a <data> element or <struct> element to be used as a base location for the offset. The element name specified must be the parent or an ancestor of this element. The value from the offset attribute will be relative to the location of the element specified on this attribute. The data-name or struct-name specified can be a fully qualified name or a name that is relative to the current element. In either case, the name must reference an ancestor of this element. If the offsetfrom attribute is not specified, the base location for the offset specified on the offset attribute is the parent of this element. The offset and offsetfrom attributes are only used to process output data from a program. These attributes do not control the offset or displacement of input data. |
| outputsize= | "number" \| "data-name" | Specifies the number of bytes to reserve for output data for this element. For output parameters which are variable in length, this attribute is needed to specify how many bytes should be reserved for data to be returned from the AS/400 program. This attribute can be specified on all variable length fields and variable sized arrays, or it can be specified for an entire parameter that contains one or more variable length fields. This attribute is not necessary and should not be specified for fixed-size output parameters. The value specified on this attribute is used as the total size for this element including all children of this element. Therefore, the outputsize attribute is ignored on any children or descendants of this element. If a number is specified, it defines a fixed number of bytes to reserve. That is, the number of bytes reserved for output data never changes. If a data-name is specified, it defines the name of a <data> element within the PCML document that will contain, at runtime, the number of bytes to reserve for output data. The data-name specified can be a fully qualified name or a name that is relative to the current element. In either case, the name must reference a <data> element that is defined with type="int". If this attribute is omitted, the number of bytes to reserve for output data is determined at runtime by adding the number of bytes to reserve for all of the children of this <struct> element. |
| usage= | "inherit" | The usage of this structure is inherited from its parent element. If this structure does not have a parent, usage is assumed to be inputoutput. |
| | "input" | This structure is an input value to the host program. For character and numeric types, the appropriate conversion is performed. |
| | "output" | This structure is an output value from the host program. For character and numeric types, the appropriate conversion is performed. |
| | "input-output" | This structure is both and input and an output value. |

The <data> Tag

```
<data type="{ char | int | packed | zoned | float | byte | struct }"
    [ ccsid="{ number | data-name}" ]
    [ count="{ number | data-name}" ]
    [ init="string" ]
    [ length="{ number | data-name}" ]
    [ maxvrm="version-string" ]
    [ minvrm="version-string" ]
    [ name="name" ]
    [ offset="{ number | data-name }" ]
    [ offsetfrom="{ number | data-name | struct-name }" ]
    [ outputsize="{ number | data-name | struct-name }" ]
    [ precision="number" ]
    [ struct="struct-name" ]
    [ usage="{ inherit | input | output | inputoutput }" ]
/>
```

| Attribute | Value | Description |
|---|---|---|
| type= | "char" | This <data> element is a character value. The length attribute specifies the number of bytes of data. Note that this may be different than the number of characters. This data value is returned as a java.lang.String. |
| | "int" | This <data> element is an integer value. The length attribute specifies the number of bytes, 2 or 4. The precision attribute specifies the number of bits of precision. length="2" precision="15" Specifies a 16-bit signed integer. This data value is returned as a java.lang.Short. length="2" precision="16" Specifies a 16-bit unsigned integer. This data value is returned as a java.lang.Integer. length="4" precision="31" Specifies a 32-bit signed integer. This data value is returned as a java.lang.Integer. length="4" precision="32" Specifies a 32-bit unsigned integer. This data value is returned as a java.lang.Long. |

-continued

| | | |
|---|---|---|
| | "packed" | For length="2" the default precision is 15. For length="4" the default precision is 31. This <data> element is a packed decimal value. The length attribute specifies the number of digits. The precision attribute specifies the number of decimal positions. This data value is returned as a java.math.BigDecimal. |
| | "zoned" | This <data> element is a zoned decimal value. The length attribute specifies the number of digits. The precision attribute specifies the number of decimal positions. This data value is returned as a java.math.BigDecimal. |
| | "float" | This <data> element is a floating point value. The length attribute specifies the number of bytes, 4 or 8. For length="4", this data value is returned as a java.lang.Float. For length="8", this data value is returned as ajava.lang.Double. |
| | "byte" | This <data> element is a byte value. The length attribute specifies the number of bytes. No conversion is performed on the data. This data value is returned as an array of byte values (byte[ ]). |
| | "struct" | This <data> element is a structure. The struct attribute specifies the name of the a <struct> element. This attribute allows you to define a structure once and reuse it multiple times within the document. When type="struct" it is as if the structure specified appeared at this location in the document. |
| ccsid= | "number" \| "data-name" | Specifies the host Coded Character Set ID (CCSID) for character data for this <data> element. This attribute can be specified only for <data> elements with type="char". If a number is specified, it defines a fixed CCSID. That is, the CCSID never changes. If a data-name is specified, it defines the name of a <data> element within the PCML document that will contain, at runtime, the CCSID of the character data. The data-name specified can be a fully qualified name or a name that is relative to the current element. In either case, the name must reference a <data> element that is defined with type="int". If this attribute is omitted, character data for this element is assumed to be in the default CCSID of the host environment. |
| count= | "number" \| "data-name" | Specifies that this element is an array and identifies the number of entries in the array. If a number is specified, it defines a fixed sized array. That is, the number of elements in the array never changes. If a data-name is specified, it defines the name of a <data> element within the PCML document that will contain, at runtime, the number of elements in the array. The data-name specified can be a fully qualified name or a name that is relative to the current element. In either case, the name must reference a <data> element that is defined with type="int". If this attribute is omitted, this element is not defined as an array, although it may be contained within another element that is defined as an array. |
| init= | "string" | Specifies an initial value for this <data> element. For <data> elements with usage="input" or usage="inputoutput" this value is used if the value is not explicitly set by the application program. The initial value specified is used to initialize scalar values. If the element is defined as an array or is contained within a structure defined as an array, the initial value specified is used as an initial value for all entries in the array. |
| length= | "number" \| "data-name" | Specifies the length of the data element. Usage of this attribute varies depending on the data type. |

| | Data Type | Description |
|---|---|---|
| | type="char" | The length attribute specifies the number of bytes, of data for this element. Note that this is not necessarily the number of characters. A literal number or data-name must be specified. |
| | type="int" | The length attribute specifies the number of bytes, 2 or 4, of data for this element. The precision attribute is used to specify the number of bits of precision and indicates whether the integer is signed or unsigned. A literal number must be specified. |
| | type= "packed" | The length attribute specifies the number of numeric digits of data for this element. The precision attribute is used to specify the number of decimal digits. A literal number must be specified. |
| | type="zoned" | The length attribute specifies the number of numeric digits of data for this element. The precision attribute is used to specify the number of decimal digits. A literal number must be specified. |
| | type="float" | The length= attribute specifies the number of bytes, 4 or 8, of data for this element. A literal number must be specified. |
| | type="byte" | The length= attribute specifies the number of bytes of data for this element. A literal number or data-name must be specified. |
| | type="struct" | The length= attribute is not allowed. |
| | | If a number is specified, it defines a fixed length. That is, the length never changes. If a data-name is specified, it defines the name of a <data> element within the PCML document that will contain, at runtime, the length. A data-name can be specified only for <data> elements with type="char" or type="byte". The data-name specified can be a fully qualified name or a name that is relative to the current element. In either case, the name must reference a <data> element that is defined with type="int". |
| maxvrm= | "version-string" | Specifies the highest OS/400 version on which this element exists. If the OS/400 version is greater than the version specified on this attribute, this element and its children, if any exist, will not be processed during a call to a program. This attribute is helpful for defining program interfaces which differ between releases of OS/400. The syntax of the version string must be "VvRrMm", where the capitals letters "V", "R" and "M" are literal characters and "v", "r" and "m" are one or more digits representing the version, release and modification level, respectively. The value for "v" must be from 1 to 255 inclusive. The |

-continued

| | | |
|---|---|---|
| minvrm= | "version-string" | Specifies the lowest OS/400 version on which this element exists. If the OS/400 version is less than the version specified on this attribute, this element and its children, if any exist, will not be processed during a call to a program. This attribute is helpful for defining program interfaces which differ between releases of OS/400. The syntax of the version string must be "VvRrMm", where the capitals letters "V", "R" and "M" are literal characters and "v", "r" and "m" are one or more digits representing the version, release and modification level, respectively. The value for "v" must be from 1 to 255 inclusive. The value for "r" and "m" must be from 0 to 255, inclusive. |
| name= | "name" | Specifies the name of this <data> element. |
| offset= | "number" \| "data-name" | Specifies the offset to this <data> element within an output parameter. Some programs return information with a fixed structure followed by one or more variable length fields or structures. In this case, the location of a variable length element is usually specified as an offset or displacement within the parameter. This attribute is used to describe the offset to this <data> element. If a number is specified, it defines a fixed offset. That is, the offset to this element never changes. If a data-name is specified, it defines the name of a <data> element within the PCML document that will contain, at runtime, the offset to this element. The data-name specified can be a fully qualified name or a name that is relative to the current element. In either case, the name must reference a <data> element that is defined with type="int". This attribute is used in conjunction with the offsetfrom attribute. If the offsetfrom attribute is not specified, the base location for the offset specified on the offset attribute is the parent of this element. The offset and offsetfrom attributes are only used to process output data from a program. These attributes do not control the offset or displacement of input data. If this attribute is omitted, the location of the data for this element is immediately following the preceding element in the parameter, if any. |
| offsetfrom= | "number" \| "data-name" \| "struct-name" | Specifies the base location from which the offset attribute is relative. If a number is specified, it defines a fixed base location. That is, the base location to this element never changes. This is most typically used to specify number="0" indicating that the offset is an absolute offset from the beginning of the parameter. If a data-name or struct-name is specified, it defines the name of a <data> element or <struct> element to be used as a base location for the offset. The element name specified must be the parent or an ancestor of this element. The value from the offset attribute will be relative to the location of the element specified on this attribute. The data-name or struct-name specified can be a fully qualified name or a name that is relative to the current element. In either case, the name must reference an ancestor of this element. If the offsetfrom attribute is not specified, the base location for the offset specified on the offset attribute is the parent of this element. |

-continued

| | | |
|---|---|---|
| | | The offset and offsetfrom attributes are only used to process output data from a program. These attributes do not control the offset or displacement of input data. |
| outputsize= | "number" \| "data-name" | Specifies the number of bytes to reserve for output data for this element. For output parameters which are variable in length, this attribute is needed to specify how many bytes should be reserved for data to be returned from the AS/400 program. This attribute can be specified on all variable length fields and variable sized arrays, or it can be specified for an entire parameter that contains one or more variable length fields. This attribute is not necessary and should not be specified for fixed-size output parameters. The value specified on this attribute is used as the total size for this element including all children of this element. Therefore, the outputsize attribute is ignored on any children or descendents of this element. If a number is specified, it defines a fixed number of bytes to reserve. That is, the number of bytes reserved for output data never changes. If a data-name is specified, it defines the name of a <data> element within the PCML document that will contain, at runtime, the number of bytes to reserve for output data. The data-name specified can be a fully qualified name or a name that is relative to the current element. In either case, the name must reference a <data> element that is defined with type="int". If this attribute is omitted, the number of bytes to reserve for output data is determined at runtime by adding the number of bytes to reserve for all of the children of this <struct> element. |
| precision= | "number" | The precision for some numeric data types. |

| Data Type | Description |
|---|---|
| type="int" length="2" | Use precision="15" for a signed 2-byte integer. Use precision=" 16" for an unsigned 2-byte integer. The default value is 15. |
| type="int" length="4" | Use precision="31" for a signed 4-byte integer. Use precision="32" for an unsigned 4-byte integer. |
| type= "zoned" | The precision specifies the number of decimal digits. The number specified must be greater than or equal to zero and less than or equal to the total number of digits specified on the length attribute. |
| type= "zoned" | The precision specifies the number of decimal digits. The number specified must be greater than or equal to zero and less than or equal to the total number of digits specified on the length attribute. |

| | | |
|---|---|---|
| struct= | "name" | Specifies the name of a <struct> element to for this <data> element. This attribute can be specified only for <data> elements with type="struct". |
| usage= | "inherit" | The usage of this structure is inherited from its parent element. If this structure does not have a parent, usage is assumed to be inputoutput. |
| | "input" | This structure is an input value to the host program. For character and numeric types, the appropriate conversion is performed. |

| | |
|---|---|
| "output" | This structure is an output value from the host program. For character and numeric types, the appropriate conversion is performed. |
| "input-output" | This structure is both and input and an output value. |

As shown in the previous examples, the preferred embodiments of the present invention describe a method and apparatus for generic data conversion that converts data from one format or type to a second format or type. The generic data conversion can interpret a data description that describes the interface for a server program, or can interpret any data that can be described in the manner of the current invention. The data convertor uses the data description to determine how to convert the data and where particular data is located in the data file or stream. In addition, data transmitted to another computer system can be converted prior to transferring the data to that system. The data convertor usually waits until the client application asks for particular data elements in the received data before converting the data. Because the data convertor is generic, changes to the data being transmitted by a program (such as changes caused by additions to data structures or changes caused by moving the program to a different computer) can be more easily accommodated through simple changes to the data description that describes the data.

While the present invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   at least one processor;
   a memory coupled to the at least one processor;
   a data description residing in the memory, the data description describing a current data type of at least one data element that is of the current data type, wherein the data description is configurable to accommodate changes from the current data type of the at least one data element to a different, application-compatible, data type; and
   a data convertor residing in the memory, the data converter responsive to a specific immediate request from an application for the at least one particular data element in memory, the application requiring the at least one particular data element to be expressed in the different, application-compatible, data type, the data convertor using the data description to convert only the at least one particular requested data element, the data converter configured to use a single conversion from the current data type to the different, application compatible, data type.

2. The apparatus of claim 1 wherein the data convertor converts tile at least one data element when an application requests the at least one data element.

3. The apparatus of claim 1 wherein the data description further describes a current length of the at least one data element, wherein the data description is configurable to accommodate changes from the current length of the at least one data element to a different length, and wherein the data convertor uses the current length to retrieve the at least one data element.

4. The apparatus of claim 1 wherein the data description further describes a current location of the at least one data element, wherein the location is configurable to accommodate charges from the current location of the at least one data element to a different location, and wherein the data convertor uses the current location to locate the at least one data element.

5. The apparatus of claim 1 wherein the data description further describes a current character set identifier of the at least one data element, wherein the character set identifier is configurable to accommodate changes from the current character set identifier of the at least one data element to a different character set identifier, and wherein the data convertor uses the current character set identifier to identify the proper character set used to convert the at least one data element.

6. The apparatus of claim 1 wherein the data description further describes a current range of release levels of the at least one data element, wherein an application requests that the data convertor call a program having a program release level, wherein the range of release levels is configurable to accommodate changes from the current range of release levels of the at least one data element to a different range of release levels, and wherein the data convertor will send the at least one data element to the program or convert the at least one data element received from the program if the program's release level is within the current range of release levels.

7. The apparatus of claim 1 wherein the data description comprises a parser's output, and wherein the data convertor uses the data description by using the parser's output.

8. The apparatus of claim 7 wherein the parser is an eXtensible Markup Language (XML) parser that uses a Document Type Definition (DTD) to parse a file written in Program Code Markup Language (PCML) into the parser output, wherein the at least one data element is an at least one output data element that a program will output, and wherein the data description further comprises descriptions of input data that the program expects and of a parameter list indicating the input data used to call the program, and wherein the data convertor uses the descriptions of the input data and parameter list to call the program when an application requests that the program be called.

9. The apparatus of claim 7 wherein the data convertor creates a hash table from the parser output, and wherein the data convertor uses the data description by using the hash table.

10. An apparatus comprising:
   at least one processor;
   a memory coupled to the at least one processor;
   a parser output comprising at least one of a data structure and a data object residing in the memory, the parser output created by an eXtensible Markup Language (XML) parser, the XML parser using a Document Type Definition (DTD) to parse a Program Code Markup Language (PCML) data definition into the parser output, the PCML data description comprising descriptions of the interface for a program by describing input data that the program expects, output data that the program will output, and a parameter list indicating the input data used to call the program, each description for each input and output data element comprising a data type; and
   a data convertor residing in the memory, wherein the data convertor calls the program when an application requests a call to the program, and the data convertor further uses the parser output to convert only the at least one particular data element that is sent to or received from the program, the data convertor converting only the at least one particular element from the current data type described in the PCML data description for that particular element to a second, application-compatible, data type in a single conversion, wherein the data type in the PCML data description is configurable to accommodate changes from the current data type of the at least one particular data element to a second, application-compatible, data type, wherein the data converter responds when an application makes a specific immediate request for the at least one particular data element.

11. The apparatus of claim 10 wherein the data convertor converts the at least one data element when an application requests the at least one data element.

12. The apparatus of claim 10 wherein the PCML data description further describes a current length of the at least one data element, wherein tho data description is configurable to accommodate changes from the current length of the at least one data element to a different length, and wherein the data convertor uses the current length to retrieve the at least one data element.

13. The apparatus of claim 10 wherein the PCML data description further describes a current location of the at least one data element, wherein the location is configurable to accommodate changes from the current length of the at least one data element to a different location, and wherein the data convertor uses the current location to locate the at least one data element.

14. The apparatus of claim 10 wherein the data convertor creates a hash table from the parser output, and wherein the data convertor uses the parser output by using the hash table.

15. The apparatus of claim 10 wherein the PCML data description further describes a current character set identifier of the at least one data element, wherein the character set identifier is configurable to accommodate changes from the current character set identifier of the at least one data element to a different character set identifier, and wherein the data convertor uses the current character set identifier to identify the proper character set used to convert the at least one data element.

16. The apparatus of claim 10 wherein the PCML data description further describes a current range of release levels of the at least one data element, wherein an application requests that the data convertor call a program having a program release level, wherein the range of release levels is configurable to accommodate changes from the current range of release levels of the at least one data element to a different range of release levels, and wherein the data convertor will send the at least one data element to the program or convert the at least one data element received from the program if the program's release level is within the current range of release levels.

17. A method for converting data off a computer, the data comprising at least one data element the computer comprising:
 at least one processor;
 a memory coupled to the at least one processor;
 a data description residing in the memory, the data description describing a current data type of the at least one data element that is of the current data type, wherein the data description is configurable to accommodate changes from the current data type of the at least one data element to a different, application-compatible, data type; and
 a data convertor residing in the memory;

the method comprising the steps of:
 a) an application specifically and immediately requesting at least one particular data element from the data converter;
 b) the data convertor responding when the application request is received by locating the it least one particular requested data element in the data;
 c) the data convertor using the data description to convert only the at least one particular requested data element from the current data type to the different, application-compatible, data type; and
 d) the data converter using a single conversion to convert from the current data type to the different, application-compatible, data type.

18. The method of claim 17 further comprising the step of an application requesting the at least one data element, and wherein the data convertor converts the at least one data element in response to the application's request.

19. The method of claim 17 wherein the data description further describes a current length of the at least one data element, wherein the data description is configurable to accommodate changes from the current length of the at least one data element to a different length, and wherein the method further comprises the step of the data convertor using the current length to retrieve the at least one data element.

20. The method of claim 17 wherein the data description further describes a current location of the at least one data element, wherein the location is configurable to accommodate changes from the current location of the at least one data element to a different location, and wherein the data convertor uses the location to find the at least one data element during the step of the data convertor locating at least one data element in the data.

21. The method of claim 17 wherein the data description further describes a current character set identifier of the at least one data element, wherein the character set identifier is configurable to accommodate changes from the current character set identifier of the at least one data element to a different character set identifier, and wherein the step of the data convertor using the data description to convert the at least one data element from the current data type to a second data type further comprises the step of the data convertor using the current character set identifier to identify the proper character set used to convert the at least one data element.

22. The method of claim 17 wherein the data description further describes a current range of release levels of applications that receive input or produce output of the at least one data element, wherein the range of release levels is configurable to accommodate changes from the current range of release levels of the at least one data element to a different range of release levels, wherein the method further comprises the steps of:
 d) an application requesting that the data convertor call a program having a program release level;
 e) the data converter determining if the program's release level is within the current range of release levels; and
 f) the data convertor sending the at least one data element to the program or converting the at least one data element received from the program if the if the program's release level is within the current range of release levels.

23. The method of claim 17 wherein the method further comprises the steps of:
 parsing the data description to create a parser output; and
 the data convertor using the data description by using the parser's output.

24. The method of claim 23 wherein the at least one data element is an at least one output data element that a program will output, wherein the data description further comprises descriptions of input data that the program expects and of a parameter list indicating the input data used to call the program, wherein the step of parsing the data description to create a parser output is performed by an eXtensible Markup Language (XML) parser that uses a Document Type Definition (DTD) to parse the data description written in Program Code Markup Language (PCML) into the parser output, and wherein the method further comprises the steps of an application requesting that the program be called, and the data convertor calling the program by using the descriptions of the input data and parameter list.

25. The method of claim 23 wherein the method further comprises the step of the data convertor creating a hash table from the parser output, and wherein the data convertor uses the data description by using the hash table.

26. A method for converting data on a computer, the computer comprising:
   at least one processor;
   a memory coupled to the at least one processor; and
   a data convertor residing in the memory;
   the method comprising the steps of:
   a) an eXtensible Markup Language (XML) parser creating a parser output, the XML parser using a Document Type Definition (DTD) to parse a Program Code Markup Language (PCML) data description into the parser output, the PCML data description comprising descriptions of the interface for a program by describing input data that the program expects, output data that the program will output, and a parameter list indicating the input data used to call the program, each description for each input and output data element comprising a data type, wherein each data type in the PCML data description is configurable to accommodate changes from a first data type of the input or output data to a second, application compatible, data type;
   b) an application requesting the data converter to call to a program;
   c) if there are any input data, the data convertor converting only each input data element from the first data type described in the data description for that input data element to a second, application-compatible, data type using a single conversion;
   d) the data convertor calling the program with the correct input data of the second data type, if any, in the correct order, the data converter using the parameter list to determine the correct input data and using the parse order to determine the correct order of input data, the data convertor accessing the parser output to use the parameter list and the parse order;
   e) the application requesting at least one output data element from the data converter;
   f) the data convertor locating the at least one output data element in a data output by the program; and
   g) the data convertor converting only the at least one output data element from the output data type described in the data description for the at least one output data element to a third data type using a single conversion.

27. The method of claim 26 wherein the each description for each input and output data element further comprises a current length of each data element, wherein the length is configurable to accommodate changes from the current length of the data element to a different length.

28. The method of claim 26 wherein the data description further describes a current location of the at least one output data element, wherein the location is configurable to accommodate changes from the current location of the at least one output data element to a different location, and wherein the data convertor uses the location to find the at least one output data element during the step of the data convertor locating the at least one output data element in the data output by the program.

29. The method of claim 26 wherein the data description further described a current range or release levels of applications that receive input or produce output of the at least one that element having a description in the PCML data definition, wherein the range of release levels is configurable to accommodate changes from the current range of release levels of the at least one data element to a different range of release levels, wherein the method further comprises the step of the data converter determining if the program's release level is within the current range of release levels, and wherein the data convertor converts the at least one data element if the program's release level is within the current range of release levels.

30. The method of claim 26 wherein the method further comprises the step of the data convertor creating a hash table from the parser output, and wherein the data convertor uses the parser by using the hash table.

31. A program product comprising:
   a data convertor residing in the memory, the data converter responsive to a specific immediate request from an application program for at least one particular data element, the data convertor using a data description to directly convert the at least one data element from a current data type to a second data type using a single conversion, the data description describing the current data type of the at least one data element that is of the current data type, wherein the data description is configurable to accommodate changes from the current data type of the at least one data element to a different data type; and
   signal bearing media bearing the data convertor.

32. The program product of claim 31 wherein the signal bearing media comprises transmission media.

33. The program product of claim 31 wherein the signal bearing media comprises recordable media.

34. The program product of claim 31 wherein the data convertor converts the at least one data element when an application requests the at least one data element.

35. The program product of claim 31 wherein the data description further describes a current length of the at least one data element, wherein the data description is configurable to accommodate changes from the current length of the at least one data element to a different length, and wherein the data convertor uses the current length to retrieve the at least data element.

36. The program product of claim 31 wherein the data description further describes a current location of the at least one data element, wherein the location is configurable to accommodate changes from the current location of the at least one data element to a different location, and wherein the data convertor uses the current location to locate the at least one data element.

37. The program product of claim 31 wherein the data description further describes a current character set identifier of the at least one data element, wherein the character set identifier is configurable to accommodate changes from the current character set identifier of the at least one at element to a different character set identifier, and wherein the data convertor uses the current character set identifier to identify the proper character set used to convert the at least one data element.

38. The program product of claim 37 wherein the data description further describes a current range of release levels of the at least one data element, wherein an application requests that the data convertor call a program having a program release level, wherein the range of release levels is configurable to accommodate changes from the current range of release levels of the at least one data element to a different range of release levels, and wherein the data convertor will send the at least one data element to the program or convert the at least one data element received from the program if the program's release level is within the current range of release levels.

39. The program product of claim 31 wherein the data description comprises a parser's output, and wherein the data convertor uses the data description by using the parser's output.

40. The program product of claim 39 wherein the parser is an eXtensible Markup Language (XML) parser that uses a Document Type Definition (DTD) to parse a file written in Program Code Markup Language (PCML) into the parser output, wherein the at least one data element is an at least one output data element that a program will output, and wherein the data description further comprises descriptions of input data that the program expects and of a parameter list indicating the input data used to call the program, and wherein the data convertor uses the descriptions of the input data and parameter list to call the program when an application requests that the program be called.

41. The program product of claim 31 wherein the data convertor creates a hash table from the parser output, and wherein the data convertor uses the data description by using the hash table.

42. A program product comprising:
a data convertor residing in the memory, wherein the data convertor calls a program when an application requests the call to the program, and the data convertor further uses a parser output to convert at least one data element that is sent to or received from the program, the data convertor converting only the at least one element from its current data type described in a PCML data description for that at least one element to a second, application compatible, data type using a single conversion, the parser output created by an eXtensible Markup Language (XML) parser, the XML parser using a Document Type Definition (DTD) to parse the Program Code Markup Language (PCML) data definition into the parser output, the PCML data description comprising descriptions of the interface for a program by describing input data that the program expects, output data that the program will output, and a parameter list indicating the input data used to call the program, each description for each input and output data element comprising a data type, and wherein the data type in the PCML data description is configurable to accommodate changes from the current data type of the at least one data element to a second, application compatible, data type; and signal bearing media bearing the data convertor.

43. The program product of claim 42 wherein the signal bearing media comprises transmission media.

44. The program product of claim 42 wherein the signal bearing media comprises recordable media.

45. The program product of claim 42 wherein the data convertor converts the at least one data element when an application requests the at least one data element.

46. The program product of claim 42 wherein the PCML data description further describes a current length of the at least one data element, wherein the data description is configurable to accommodate changes from the current length of the at least one data element to a different length, and wherein the data convertor uses the current length to retrieve the at least one data element.

47. The program product of claim 42 wherein the PCML data description further describes a current location of the at least one data element, wherein the location is configurable to accommodate changes from the current location of the at least one data element to a different location, and wherein the data convertor uses the current location to locate the at least one data element.

48. The program product of claim 42 wherein the data convertor creates a hash table from the parser output, and wherein the data convertor uses the parser output by using the hash table.

49. The program product of claim 42 wherein the PCML data description further describes a current character set identifier of the at least one data element, wherein the character set identifier is configurable to accommodate changes from the current character set identifier of the at least one data element to a different character set identifier, and wherein the data convertor uses the current character set identifier to identify the proper character set used to convert the at least one data element.

50. The program product of claim 42 wherein the data description comprises a parsers output, and wherein the data convertor uses the data description by using the parse's output.

51. The program product of claim 42 wherein the PCML data description further describes a current range of release levels of the at least one data element, wherein an application requests that the data convertor call a program having a program release level, wherein the range of release levels is configurable to accommodate changes from the current range of release levels of the at least one data element to a different range of release levels, and wherein the data convertor will send the at least one data element to the program or convert the at least one data element received from the program if the program's release level is within the current range of release levels.

* * * * *